US012554142B2

(12) United States Patent
Tokuyama

(10) Patent No.: US 12,554,142 B2
(45) Date of Patent: Feb. 17, 2026

(54) IMAGE FOLLOWING INFORMATION DETECTING DEVICE, IMAGE FOLLOWING DEVICE, IMAGE FOLLOWING INFORMATION DETECTING METHOD, AND IMAGE FOLLOWING METHOD

(71) Applicant: SONY GROUP CORPORATION, Tokyo (JP)

(72) Inventor: Kazutatsu Tokuyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 688 days.

(21) Appl. No.: 17/795,625

(22) PCT Filed: Dec. 15, 2020

(86) PCT No.: PCT/JP2020/046682
§ 371 (c)(1),
(2) Date: Jul. 27, 2022

(87) PCT Pub. No.: WO2021/157204
PCT Pub. Date: Aug. 12, 2021

(65) Prior Publication Data
US 2023/0095993 A1    Mar. 30, 2023

(30) Foreign Application Priority Data

Feb. 4, 2020    (JP) ................................ 2020-016944

(51) Int. Cl.
*G02B 27/01*    (2006.01)
*A61B 3/113*    (2006.01)
(Continued)

(52) U.S. Cl.
CPC .......... *G02B 27/0179* (2013.01); *A61B 3/113* (2013.01); *G01J 1/0411* (2013.01);
(Continued)

(58) Field of Classification Search
CPC ....... A61B 3/113; G01J 1/0411; G01J 1/0413; G01J 1/0429; G01J 1/60; G02B 5/32;
(Continued)

(56) References Cited

U.S. PATENT DOCUMENTS 7,286,287 B1 * 10/2007 Ofner ................. G02B 27/0176
359/422
2013/0016413 A1    1/2013 Saeedi et al.
(Continued)

FOREIGN PATENT DOCUMENTS

CN        107783297 A  *  3/2018    ......... G02B 27/0172
JP        2003-029198        1/2003
(Continued)

OTHER PUBLICATIONS

International Search Report and Written Opinion prepared by the Japan Patent Office on Mar. 1, 2021, for International Application No. PCT/JP2020/046682, 2 pgs.

*Primary Examiner* — Cory A Almeida
(74) *Attorney, Agent, or Firm* — Sheridan Ross PC

(57) ABSTRACT

An image following information detecting device capable of obtaining information for causing a central portion of an image to follow a line-of-sight of a user. The device includes: an image display system including an image light projecting unit, and a transmissive reflection member that reflects a part of the image light toward an eyeball and transmits other parts; and a line-of-sight detection system including at least one invisible light source, a diffractive optical element provided integrally with the transmissive reflection member and including a reflective diffraction portion that reflects and diffracts invisible light toward the eyeball, and a light receiving element that receives the invisible light reflected by the eyeball. A portion irradiated with a central portion of the image light of the transmissive reflection member and the reflective diffraction portion
(Continued)

overlap each other when viewed from a thickness direction of the transmissive reflection member.

25 Claims, 14 Drawing Sheets

(51) Int. Cl.
| | |
|---|---|
| *G01J 1/04* | (2006.01) |
| *G01J 1/60* | (2006.01) |
| *G02B 5/32* | (2006.01) |
| *G02B 27/00* | (2006.01) |
| *G02B 27/02* | (2006.01) |
| *G09G 3/02* | (2006.01) |
| *G09G 5/38* | (2006.01) |
| *H04N 5/64* | (2006.01) |
| *H04N 13/344* | (2018.01) |

(52) U.S. Cl.
CPC ............ *G01J 1/0414* (2013.01); *G01J 1/0429* (2013.01); *G01J 1/60* (2013.01); *G02B 5/32* (2013.01); *G02B 27/0093* (2013.01); *G02B 27/0172* (2013.01); *G02B 27/0176* (2013.01); *G09G 3/025* (2013.01); *G09G 5/38* (2013.01); *H04N 5/64* (2013.01); *H04N 13/344* (2018.05); *G02B 2027/0123* (2013.01); *G02B 2027/0138* (2013.01); *G02B 2027/0187* (2013.01); *G02B 27/02* (2013.01); *G09G 2340/0464* (2013.01)

(58) Field of Classification Search
CPC  G02B 27/0093; G02B 27/017; G02B 27/072; G02B 27/0176; G02B 27/0179; G02B 27/02; G02B 2027/0123; G02B 2027/0138; G02B 2027/0187; G09G 3/025; G09G 5/38; G09G 2340/0464; H04N 5/64; H04N 13/344
See application file for complete search history.

(56) References Cited

U.S. PATENT DOCUMENTS

| | | |
|---|---|---|
| 2016/0018639 A1 | 1/2016 | Spitzer |
| 2016/0041384 A1 | 2/2016 | Robbins |
| 2018/0232048 A1 | 8/2018 | Popovich et al. |
| 2018/0246336 A1* | 8/2018 | Greenberg ......... G02B 27/0176 |
| 2018/0278924 A1 | 9/2018 | Schowengerdt |
| 2019/0056599 A1 | 2/2019 | Reshidko |
| 2020/0033590 A1 | 1/2020 | Katsuyama et al. |
| 2020/0033603 A1* | 1/2020 | Ohkawa ............. G02B 27/0103 |
| 2020/0249754 A1* | 8/2020 | Morozov ............. G06F 3/0304 |

FOREIGN PATENT DOCUMENTS

| | | |
|---|---|---|
| KR | 20190139862 A | 12/2019 |
| WO | WO 2018/186046 | 10/2018 |

* cited by examiner

TOTAL LIGHT AMOUNT = A+B+C+D
HORIZONTAL SIGNAL = (A+C)-(B+D)
VERTICAL SIGNAL = (A+B)-(C+D)

IMAGE FOLLOWING INFORMATION DETECTING DEVICE, IMAGE FOLLOWING DEVICE, IMAGE FOLLOWING INFORMATION DETECTING METHOD, AND IMAGE FOLLOWING METHOD

CROSS REFERENCE TO RELATED APPLICATIONS

This application is a national stage application under 35 U.S.C. 371 and claims the benefit of PCT Application No. PCT/JP2020/046682, having an international filing date of 15 Dec. 2020, which designated the United States, which PCT application claimed the benefit of Japanese Patent Application No. 2020-016944, filed 4 Feb. 2020, the entire disclosures of each of which are incorporated herein by reference.

TECHNICAL FIELD

The technology according to the present disclosure (hereinafter, also referred to as "the present technology") relates to an image following information detecting device, an image following device, an image following information detecting method, and an image following method.

BACKGROUND ART

Conventionally, there is known a display device that irradiates a projection surface in a user's field of view with image light to visually recognize an image as a virtual image. For example, Patent Document 1 discloses a display device on which a line-of-sight detection device is mounted and which allows a user to visually recognize an image as a virtual image via a half mirror serving as a projection surface.

CITATION LIST

Patent Document

Patent Document 1: Japanese Patent Application Laid-Open No. 2003-29198

SUMMARY OF THE INVENTION

Problems to be Solved by the Invention

However, the conventional display device cannot obtain information for causing the central portion of the image to follow the line-of-sight of the user.

Therefore, a main object of the present technology is to provide an image following information detecting device capable of obtaining information for causing a central portion of an image to follow a line-of-sight of a user, an image following device including the image following information detecting device, an image following information detecting method using the image following information detecting device, and an image following method using the image following information detecting device.

Solutions to Problems

The present technology provides an image following information detecting device including: an image display system including an image light projecting unit that projects image light, and a transmissive reflection member that reflects a part of the image light projected from the image light projecting unit toward an eyeball and transmits other parts; and a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives the invisible light reflected by the eyeball and reflected and diffracted by the reflective diffraction portion.

A portion irradiated with a central portion of the image light of the transmissive reflection member and the reflective diffraction portion overlap each other when viewed from a thickness direction of the transmissive reflection member.

A portion of the transmissive reflection member irradiated with a central portion of the image light and a central portion of the reflective diffraction portion may overlap each other when viewed from a thickness direction of the transmissive reflection member.

The size of the reflective diffraction portion may be equal to or smaller than the maximum diameter of the pupil of the eyeball.

The maximum diameter of the pupil may be 8 mm.

The image light projecting unit may be provided integrally with the transmissive reflection member.

The light receiving element may have a plurality of light receiving regions.

The plurality of light receiving regions may be four light receiving regions arranged two-dimensionally.

The diffractive optical element may include a plurality of the reflective diffraction portions stacked in a thickness direction and having different diffraction wavelengths and sizes, and the line-of-sight detection system may include: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit.

The pupil diameter acquisition unit may include an illuminance sensor, and obtain the pupil diameter on the basis of a detection result of the illuminance sensor.

The diffractive optical element may include a plurality of the reflective diffraction portions stacked in a thickness direction and having different diffraction wavelengths and sizes, and the line-of-sight detection system may include a plurality of the invisible light sources having different emission wavelengths, and obtain information for calculating a deviation between a center of an image displayed by the image display system and a line-of-sight that is an orientation of the eyeball for each lighting of the plurality of invisible light sources.

A beam splitter that is arranged between the reflective diffraction portion and the light receiving element and into which invisible light from the invisible light source is incident is further included. The beam splitter may reflect a part of invisible light from the invisible light source toward the reflective diffraction portion and transmit a part of invisible light from the reflective diffraction portion toward the light receiving element.

The line-of-sight detection system may include a collimating lens that collimates invisible light emitted from the invisible light source.

The line-of-sight detection system may include a polarizing plate arranged on an optical path of the invisible light between the invisible light source and the reflective diffraction portion.

The line-of-sight detection system may include a wavelength selection filter arranged on an optical path of the invisible light between the reflective diffraction portion and the light receiving element.

The image light projecting unit may be provided integrally with the transmissive reflection member.

The present technology also provides an image following device including: the image following information detecting device, in which the image light projecting unit is provided integrally with the transmissive reflection member; an actuator that moves the image display system and the diffractive optical element in a direction parallel to an in-plane direction of the transmissive reflection member; and a control device that controls the actuator on the basis of a signal from a light receiving element of the image following information detecting device.

The image following device may include a collimating lens that collimates invisible light from the invisible light source to have a cross-sectional size corresponding to an expected movement range of the image display system and the diffractive optical element.

The light receiving element may include a plurality of light receiving regions arranged two-dimensionally, and the control device may detect a deviation between a center of an image displayed by the image display system and a line-of-sight which is an orientation of the eyeball on the basis of signals from the plurality of light receiving regions, and control the actuator on the basis of a detection result.

The control device may control the actuator to cause an image by the image light to follow the line-of-sight.

The reflective diffraction portion may have a vertically long shape, and the actuator may move the image display system and the diffractive optical element in a direction orthogonal to a longitudinal direction of the reflective diffraction portion.

The reflective diffraction portion may have a horizontally long shape, and the actuator may move the image display system and the diffractive optical element in a direction orthogonal to a longitudinal direction of the reflective diffraction portion.

The diffractive optical element may include a plurality of the reflective diffraction portions of a vertically long shape stacked in a thickness direction and having different diffraction wavelengths and sizes. The line-of-sight detection system may include: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit. The actuator may move the image display system in a direction orthogonal to a longitudinal direction of the reflective diffraction portion.

The diffractive optical element may include a plurality of the reflective diffraction portions of a horizontally long shape stacked in a thickness direction and having different diffraction wavelengths and sizes. The line-of-sight detection system may include: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit. The actuator may move the image display system in a direction orthogonal to a longitudinal direction of the reflective diffraction portion.

The present technology also provides an image display device including the image following device.

The present technology also provides an image following information detecting method for causing an image to follow a line-of-sight using an image following information detecting device, the method including:
displaying an image by an image display system of the image following information detecting device; and
acquiring a detection result of a line-of-sight detection system of the image following information detecting device as deviation information between the line-of-sight and a central portion of the image.

The present technology also provides an image following method for causing an image to follow a line-of-sight using an image following information detecting device, the image following method including:
displaying an image by an image display system of the image following information detecting device;
acquiring a detection result of a line-of-sight detection system of the image following information detecting device as deviation information between the line-of-sight and a central portion of the image; and
moving integrally at least the image light projecting unit, the transmissive reflection member, and the diffractive optical element on the basis of the deviation information.

In the moving, at least the image light projecting unit, the transmissive reflection member, and the reflective diffraction portion may be integrally moved so as to cause the image to follow the line-of-sight.

MODE FOR CARRYING OUT THE INVENTION

Figure 1:
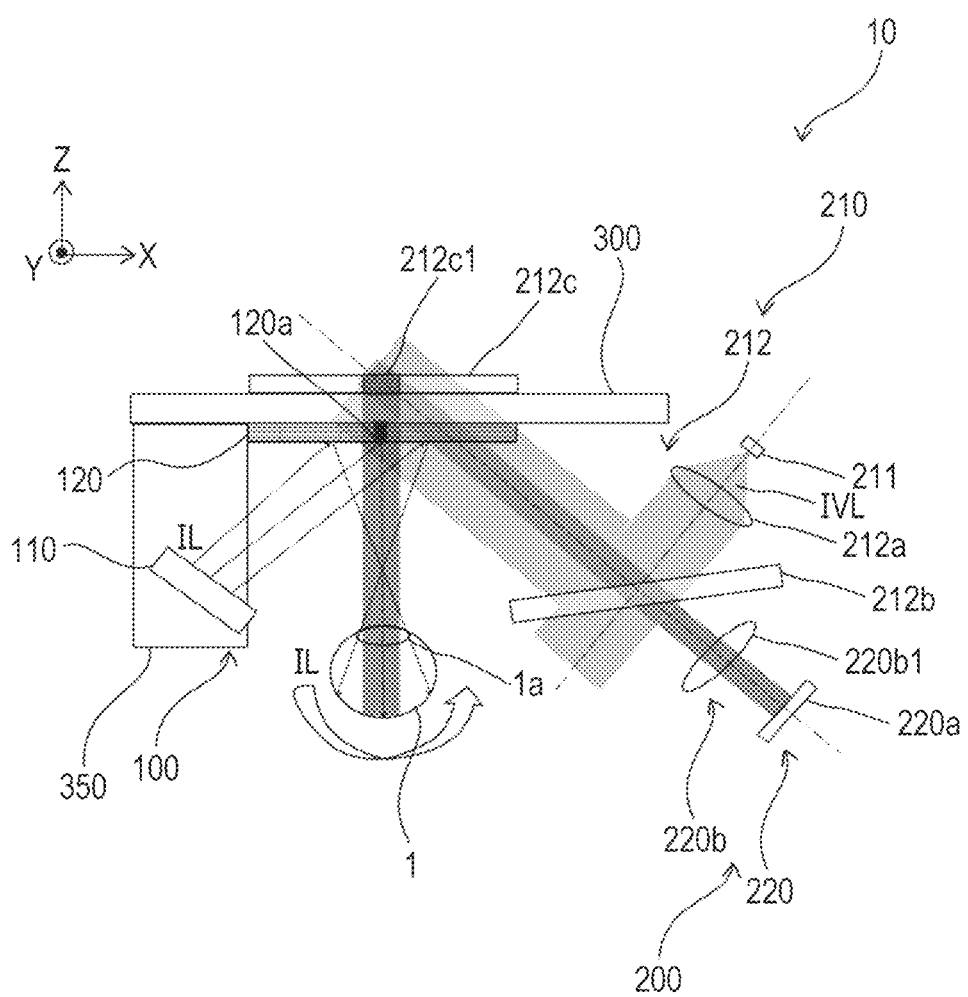
FIG. 1 is a cross-sectional view illustrating a Configuration Example of an image following information detecting device according to a first embodiment of the present technology.

Hereinafter, preferred embodiments of the present technology will be described in detail with reference to the accompanying drawings. Note that, in the present specification and the drawings, components having substantially the same functional configuration are denoted by the same reference numerals, and redundant description is omitted. The embodiments described below illustrate representative embodiments of the present technology, and the scope of the present technology is not narrowly interpreted by these embodiments. In the present specification, even in a case where it is described that each of an image following information detecting device, an image following device, an image following information detecting method, and an image following method according to the present technology exhibits a plurality of effects, each of the image following information detecting device, the image following device, the image following information detecting method, and the image following method according to the present technology is only required to exhibit at least one effect. The effects described in the present specification are merely examples and are not limited, and other effects may be provided.

Furthermore, description will be given in the following order.
1. Introduction
2. Image Following Information Detecting Device according to First Embodiment of Present Technology and Image Following Device including Image Following Information Detecting Device
3. Image Following Information Detecting Device according to Second Embodiment of Present Technology and Image Following Device including Image Following Information Detecting Device
4. Image Following Information Detecting Device according to Third Embodiment of Present Technology and Image Following Device including Image Following Information Detecting Device
5. Image Following Information Detecting Device according to Fourth Embodiment of Present Technology and Image Following Device including Image Following Information Detecting Device
6. Image Following Information Detecting Device according to Fifth Embodiment of Present Technology and Image Following Device including Image Following Information Detecting Device
7. Modification of Present Technology

1. <Introduction>

In recent years, in an HMD (head mounted display) in which development competition is intensifying, detection of eyeball information such as line-of-sight detection is used for, for example, foveated rendering and expansion of a viewable region (eye box). The HMD displays, for example, an augmented reality (AR) image for the user.

2. <Image Following Information Detecting Device According to First Embodiment of Present Technology and Image Following Device Including Image Following Information Detecting Device>

An image following information detecting device 10 according to a first embodiment of the present technology and an image following device including the image following information detecting device 10 will be described using the drawings.

The image following information detecting device 10 is mounted on, for example, an HMD (head mounted display) which is an example of an image display device mounted on the head of the user. The HMD is also called an eyewear, for example.

That is, the image following information detecting device 10 is a head mounted type.

(Image Following Information Detecting Device according to First Embodiment)

FIG. 1 is a cross-sectional view schematically illustrating a configuration of the image following information detecting device 10 according to the first embodiment. Hereinafter, it is assumed that the image following information detecting device 10 is worn on the head of the user.

As illustrated in FIG. 1, image following information detecting device 10 includes an image display system 100 and a line-of-sight detection system 200.

[Image Display System]

The image display system 100 includes an image light projecting unit 110 and a transmissive reflection member 120 (also called combiner).

The image light projecting unit 110 projects image light IL (visible light). As an example, the image light projecting unit 110 includes a light source unit that emits the image light IL and a projection lens that is arranged on an optical path of the image light IL from the light source unit and projects the image light IL toward the transmissive reflection member 120.

The image light projecting unit 110 is provided integrally with the transmissive reflection member 120.

The transmissive reflection member 120 reflects a part of the image light IL projected from the image light projecting unit 110 toward an eyeball 1 and transmits the other parts.

As an example, the transmissive reflection member 120 is provided on a surface on the eyeball 1 side of a transmission substrate 300 (for example, a transparent or translucent substrate held by the frame of the HMD) having at least transparency to visible light so as to face the eyeball 1.

As an example, a bracket 350 that supports the image light projecting unit 110 is provided on the transmission substrate 300 in a cantilevered state.

The transmissive reflection member 120 is, for example, a reflection type of diffractive optical element, and reflects and diffracts the image light IL, which is visible light, in a specific direction corresponding to the wavelength with high efficiency. Note that the transmissive reflection member 120 may be, for example, a half mirror, a glass plate, and the like.

In FIG. 1, an XYZ three-dimensional orthogonal coordinate system is set in which a direction in which the eyeball 1 and the transmissive reflection member 120 face each other is a Z-axis direction, and directions orthogonal to each other in an in-plane direction of the transmissive reflection member 120 are an X-axis direction and a Y-axis direction. Hereinafter, the XYZ three-dimensional orthogonal coordinate system will be appropriately used for description.

[Line-of-Sight Detection System]

The line-of-sight detection system 200 includes an irradiation system 210 and a light receiving system 220.

The irradiation system 210 irradiates the eyeball 1 with invisible light IVL (for example, infrared light).

The irradiation system 210 includes an invisible light source 211 (for example, an infrared light source) and an irradiation optical system 212 that guides the invisible light IVL (for example, infrared light) from the invisible light source 211 to the eyeball 1.

(Invisible Light Source)

The invisible light source 211 is, for example, a light source such as a semiconductor laser or a light emitting diode that emits the invisible light IVL (for example, infrared light).

(Irradiation Optical System)

The irradiation optical system 212 includes a collimating lens 212a, a beam splitter 212b, and a diffractive optical element 212c. The collimating lens is also called a coupling lens.

The collimating lens 212a is arranged on the optical path of the invisible light IVL from the invisible light source 211, and substantially collimates the invisible light substantially.

The beam splitter 212b is arranged on the optical path of the invisible light IVL via the collimating lens 212a, reflects a part of the invisible light IVL, and transmits the other parts. The beam splitter 212b is, for example, a half mirror.

The diffractive optical element 212c is arranged on the optical path of the invisible light IVL reflected by the beam splitter 212b, and reflects and diffracts the invisible light toward the eyeball 1.

The diffractive optical element 212c includes a reflective diffraction portion 212cl that reflects and diffracts the invisible light IVL from the invisible light source 211 toward the eyeball 1 (more specifically, a pupil 1a).

The reflective diffraction portion 212cl reflects and diffracts light of a specific wavelength band (invisible light, for example infrared light) in a specific direction according to the wavelength with high efficiency.

The diffractive optical element 212c is provided integrally with the transmissive reflection member 120.

That is, the diffractive optical element 212c is also integrally provided with the image light projecting unit 110.

More specifically, the diffractive optical element 212c is provided at a position corresponding to the transmissive reflection member 120 on the surface of the transmission substrate 300 on the side opposite to the eyeball 1 side.

Note that the diffractive optical element 212c may be provided integrally (directly) with the transmissive reflection member 120.

Details of the reflective diffraction portion 212cl will be described later.

(Light Receiving System)

The light receiving system 220 receives the invisible light IVL emitted from the irradiation system 210 to the eyeball 1 and reflected by the eyeball 1 (for example, the fundus of the eyeball 1).

The light receiving system 220 includes a light receiving element 220a and a light receiving optical system 220b that guides the invisible light IVL emitted from the irradiation system 210 to the eyeball 1 and reflected by the eyeball 1 to the light receiving element 220a.

The light receiving optical system 220b includes the diffractive optical element 212c that reflects and diffracts the reflected light (invisible light IVL) from the eyeball 1 toward the beam splitter 212b, and a condensing lens 220b1 that is arranged on an optical path of the invisible light IVL that has passed through the beam splitter 212b among the invisible light IVL reflected and diffracted by the diffractive optical element 212c and condenses the invisible light IVL on the light receiving element 220a.

That is, the light receiving optical system 220b shares the beam splitter 212b and the diffractive optical element 212c with the irradiation optical system 212.

In other words, the optical path of the invisible light IVL from the beam splitter 212b to the diffractive optical element 212c in the irradiation system 210 and the optical path of the invisible light IVL from the diffractive optical element 212c to the beam splitter 212b in the light receiving system 220 overlap (substantially coincide) with each other.

The light receiving element 220a has a plurality of light receiving regions.

The plurality of light receiving regions is, for example, four light receiving regions (220a-1 to 220a-4) arranged two-dimensionally. Each light receiving region is, for example, a photodiode (PD). That is, the light receiving element 220a is, for example, a four-divided photodiode.

Note that the light receiving element 220a may be an image sensor including a large number of pixels two-dimensionally arranged at a high density, but here, a four-divided photodiode is used as an example of a superior small-divided photodiode in terms of low power consumption and low latency.

The line-of-sight (the orientation of the eyeball) of the user can be detected by the received light amounts of the four light receiving regions 220a-1 to 220a-4 of the light receiving element 220a.

Figure 2A:
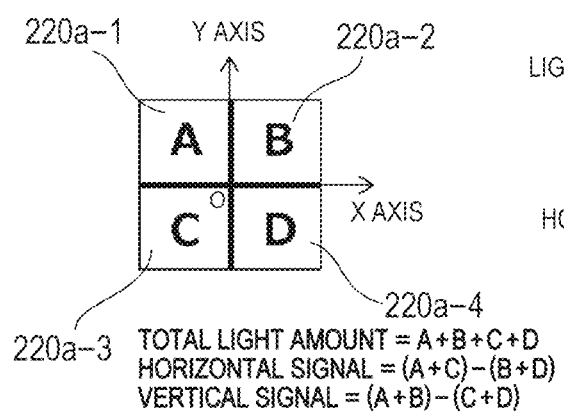
FIGS. 2A and 2B are diagrams for explaining a method for detecting a line-of-sight of a user using a light receiving element in the image following information detecting device according to the first embodiment of the present technology.

Specifically, for example, in FIG. 2A, the received light amounts of the four light receiving regions 220a-1 to 220a-4 are A, B, C, and D, respectively.

Figure 2B:
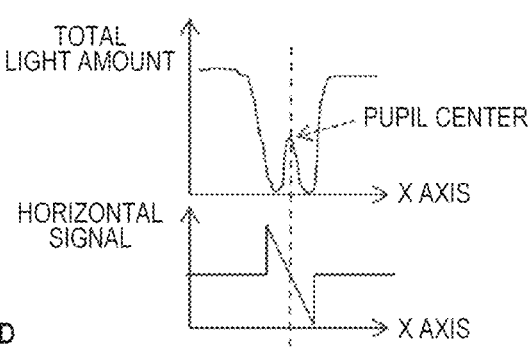

Here, as illustrated in FIG. 2A, for example, in a case where XY coordinates (for example, the X-axis direction is a horizontal direction, and the Y-axis direction is a vertical direction) with the center of the light receiving element 220a as the origin O are set, when the center of the pupil 1a is at an arbitrary position in the X-axis direction, the total received light amount (A+B+C+D) has the waveform illustrated in the upper diagram of FIG. 2B, and the horizontal signal ((A+C)−(B+D)) has the waveform illustrated in the lower diagram of FIG. 2B.

Even when the center of the pupil 1a is located at an arbitrary position in the Y-axis direction, the waveform is similar to the waveform illustrated in FIG. 2B. Therefore, the position of the center of the pupil 1a, that is, the line-of-sight (the orientation of the eyeball 1) can be detected by acquiring the total received light amount (total light amount), the horizontal signal, and the vertical signal.

(Reflective Diffraction Portion)

Returning to FIG. 1, the reflective diffraction portion 212c1 overlaps a portion 120a irradiated with the central portion of the image light IL of the transmissive reflection member 120 when viewed from the thickness direction (a direction orthogonal to in-plane direction of the transmissive reflection member 120, Z-axis direction) of the transmissive reflection member 120.

Here, as an example, the portion 120a irradiated with the central portion of the image light IL of the transmissive reflection member 120 coincides with the central portion (hereinafter, also referred to as a "combiner center") of the transmissive reflection member 120.

In this case, the reflective diffraction portion 212cl overlaps the combiner center.

Note that the portion 120a irradiated with the central portion of the image light IL of the transmissive reflection member 120 may be slightly deviated from the central portion (combiner center) of the transmissive reflection member 120.

Moreover, the central portion of the reflective diffraction portion 212c1 preferably overlaps with the portion 120a (for example, combiner center) of the transmissive reflection member 120 irradiated with the central portion of the image light IL when viewed from the thickness direction of the transmissive reflection member 120.

In this case, for example, the received light amounts of the four light receiving regions 220a-1 to 220a-4 (see FIG. 2A) of the light receiving element 220a indicate the deviation of the user's line-of-sight (pupil center) from the combiner center (center of the image displayed by the image light IL; hereinafter, also referred to as "image center"). Conversely, the received light amounts of the four light receiving regions 220a-1 to 220a-2 indicate the deviation of the image center from the user's line-of-sight (pupil center).

Moreover, the size of the reflective diffraction portion 212cl is preferably equal to or smaller than the maximum diameter of the pupil 1a of the eyeball 1.

In this case, in FIG. 1, since the light receiving system 220 can receive the light reflected from the cornea of the eyeball 1 irradiated from the irradiation system 210, it is possible to accurately obtain the deviation of the image center from the line-of-sight (pupil center).

On the other hand, for example, in a case where the size of the reflective diffraction portion is larger than the maximum diameter of the pupil 1a, the reflected light from other than the cornea is also detected, and thus, the detection sensitivity of the center of the pupil 1a becomes low.

Furthermore, the size of the reflective diffraction portion 212c1 may be equal to or larger than the minimum diameter of the pupil 1a.

In general, the diameter of the pupil 1a is 2 mm to 8 mm. That is, in general, the maximum diameter of the pupil 1a is 8 mm, and the minimum diameter of the pupil 1a is 2 mm.

In FIG. 1, the invisible light IVL emitted from the invisible light source 211 is diffused to a predetermined diffusion angle, and then, is collimated into light having a predetermined beam diameter (a beam diameter sufficiently larger than that of the reflective diffraction portion 212c1) by the collimating lens 212a. While the beam diameter is maintained, a part of the invisible light IVL is reflected by the beam splitter 212b and incident into the reflective diffraction portion 212c1.

In this case, for example, even if the image following information detecting device 10 is slightly deviated with respect to the head of the user, the invisible light IVL from the invisible light source 211 is emitted to the reflective diffraction portion 212c1.

(Configuration of Image Following Device)

The image following device including the image following information detecting device 10 according to the first embodiment further includes an actuator 400 and a control device 500.

The actuator 400 moves, for example, at least the image display system 100 and the diffractive optical element 212c in a direction parallel to the in-plane direction of the transmissive reflection member 120 (a direction parallel to the XY plane) with respect to the eyeglass frame of the HMD.

Specifically, as an example, the actuator 400 can independently move the image display system 100, the diffractive optical element 212c, and the transmission substrate 300 integrally provided in the X-axis direction and the Y-axis direction. Hereinafter, the image display system 100, the diffractive optical element 212c, and the transmission substrate 300 are also collectively referred to as a "movement target".

Here, as an example, the transmission substrate 300 is attached to the eyeglass frame of the HMD via the actuator 400.

That is, the movement target is independently movable in the X-axis direction and the Y-axis direction with respect to the eyeglass frame by the actuator 400.

Examples of the actuator 400 include a combination of a biaxial linear motor, a biaxial ball screw mechanism, and a motor as a drive source thereof, and a combination of a biaxial rack-and-pinion mechanism and a motor as a drive source thereof.

In the image following device, the collimating lens 212a of the image following information detecting device 10 collimates the invisible light IVL from the invisible light source 211 to have a cross-sectional size corresponding to the expected movement range of the movement target.

Specifically, for example, the cross-sectional size is a size with which the reflective diffraction portion 212cl can be irradiated with the invisible light IVL from the invisible light source 211 even if the movement target moves within the expected movement range.

Figure 3:
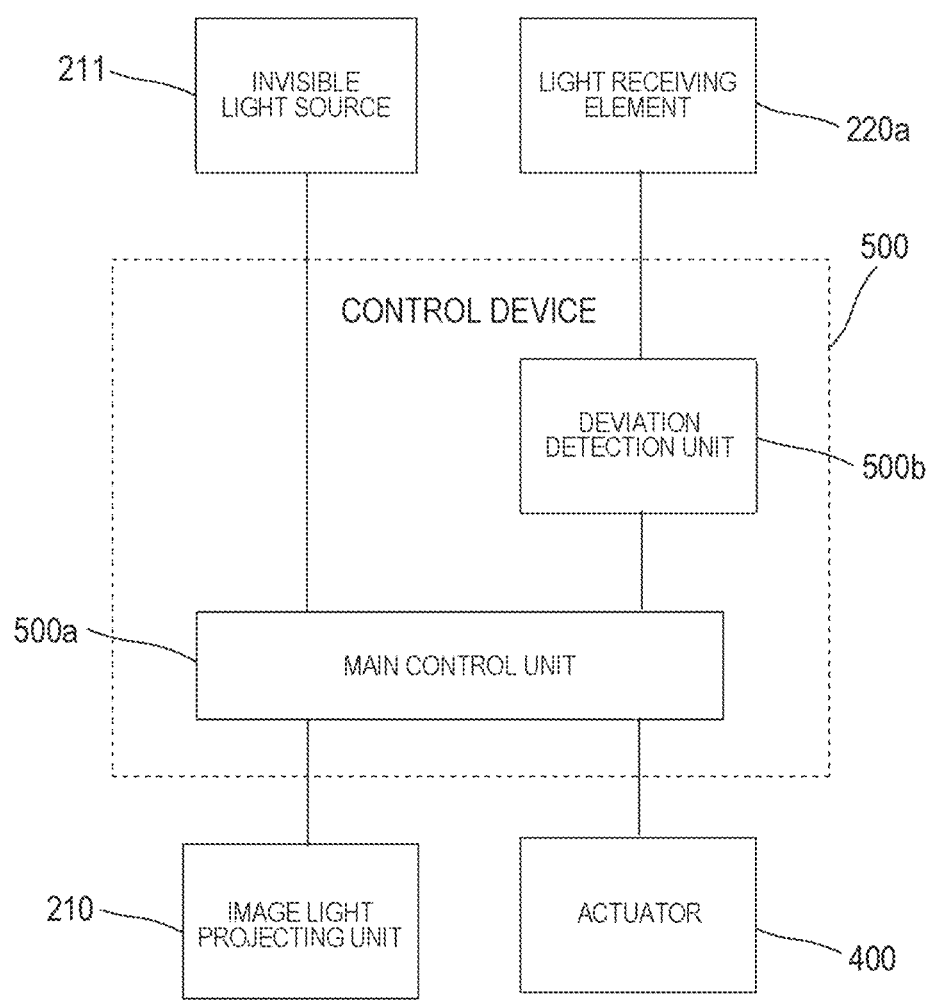
FIG. 3 is a block diagram illustrating a Configuration Example of a control device of an image following device including the image following information detecting device according to the first embodiment of the present technology.

As illustrated in FIG. 3, the control device 500 includes a main control unit 500a and a deviation detection unit 500b. The control device 500 is realized by a hardware configuration including, for example, a CPU, a chip set, and the like.

The deviation detection unit 500a detects a deviation (a deviation amount and a deviation direction) of the image from the line-of-sight on the basis of the output of the light receiving element 220a, and sends the detection result to the main control unit 500a.

The main control unit 500a generates a drive signal (pulse signal) for driving the movement target in the X-axis direction and a drive signal (pulse signal) for driving the movement target in the Y-axis direction on the basis of the deviation (a deviation direction and a deviation amount) of the image center from the line-of-sight, and outputs the drive signals to the actuator 400. Therefore, the actuator 400 is driven on the basis of the deviation of the image center from the line-of-sight.

(Operation of Image Following Device)

Figure 4:
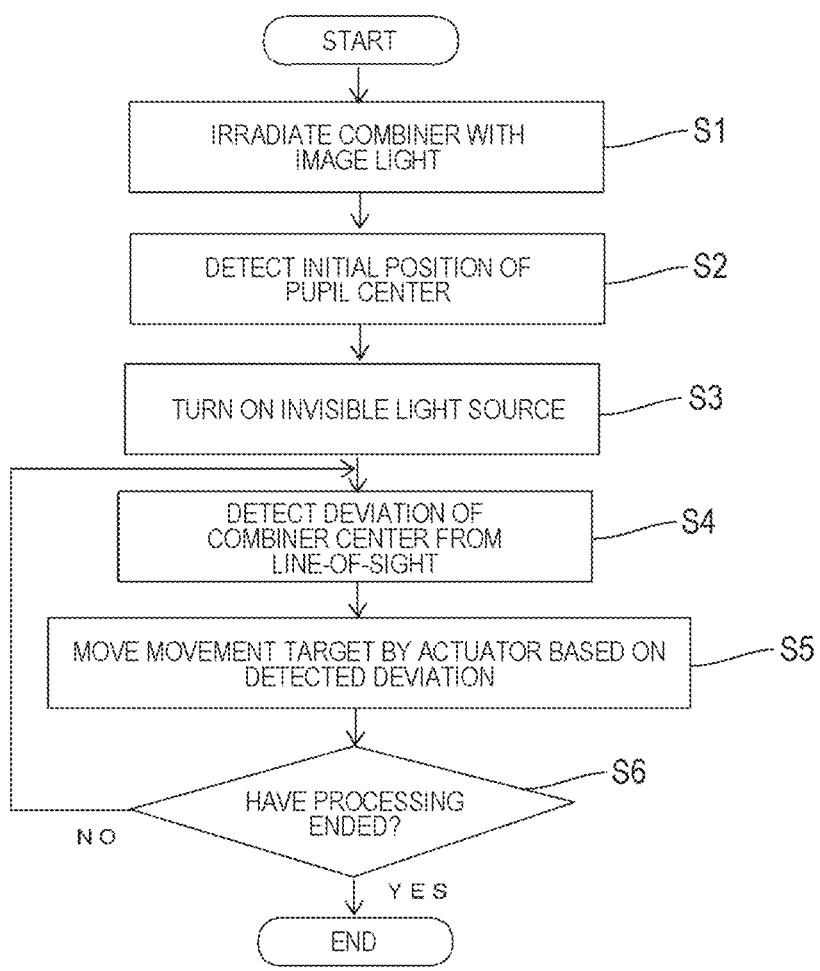
FIG. 4 is a flowchart for explaining an operation example of the image following device including the image following information detecting device according to the first embodiment of the present technology.

Hereinafter, the operation of the image following device including the image following information detecting device 10 according to the first embodiment will be described with reference to the flowchart of FIG. 4. The flowchart of FIG. 4 is based on a processing algorithm executed by the main control unit 500a of the control device 500.

In the first Step S1, the main control unit 500a irradiates the combiner (transmissive reflection member 120) with the image light IL. Specifically, the main control unit 500a projects the image light IL from the image light projecting unit 110 toward the combiner. The main control unit 500a executes Step S1, for example, when the power switch of the image following device is turned on by the user.

In the next Step S2, the main control unit 500a detects the initial position of the center (pupil center) of the pupil 1a.

Specifically, the main control unit 500a obtains the initial position of the pupil center (for example, XY coordinates of the pupil center in FIG. 2A) by controlling the actuator 400 to sweep the movement target in the X-axis direction and the Y-axis direction, respectively. For example, the main control unit 500a sweeps the movement target in the X-axis direction and the Y-axis direction, and detects the position of the combiner center when the received light amount in each light receiving region in FIGS. 2A and 2B become the same as the initial position of the pupil center.

In the state in which the initial position of the pupil center is detected, the deviation of the combiner center from the line-of-sight is 0 (state in which the line-of-sight and the combiner center intersect).

Therefore, this state (the state illustrated in FIG. 1 or the state illustrated in FIG. 7A) is set as the initial position of the movement target by the actuator 400.

In the next Step S3, the main control unit 500a turns on the invisible light source 211 (for example, an infrared light source). At this time, the invisible light IVL emitted from the invisible light source 211 is guided to the eyeball 1 by the irradiation optical system 212. At least a part of the invisible light IVL reflected by the eyeball 1 is guided to the light receiving element 220a by the light receiving optical system 220b.

In the next Step S4, the deviation detection unit 500b detects the deviation of the combiner center from the line-of-sight. Specifically, the deviation detection unit 500b detects the deviation (deviation direction and deviation amount) on the basis of the received light amounts of the four light receiving regions 220a-1 to 220a-4 of the light receiving element 220a, and sends the deviation to the main control unit 500a.

Figure 5:
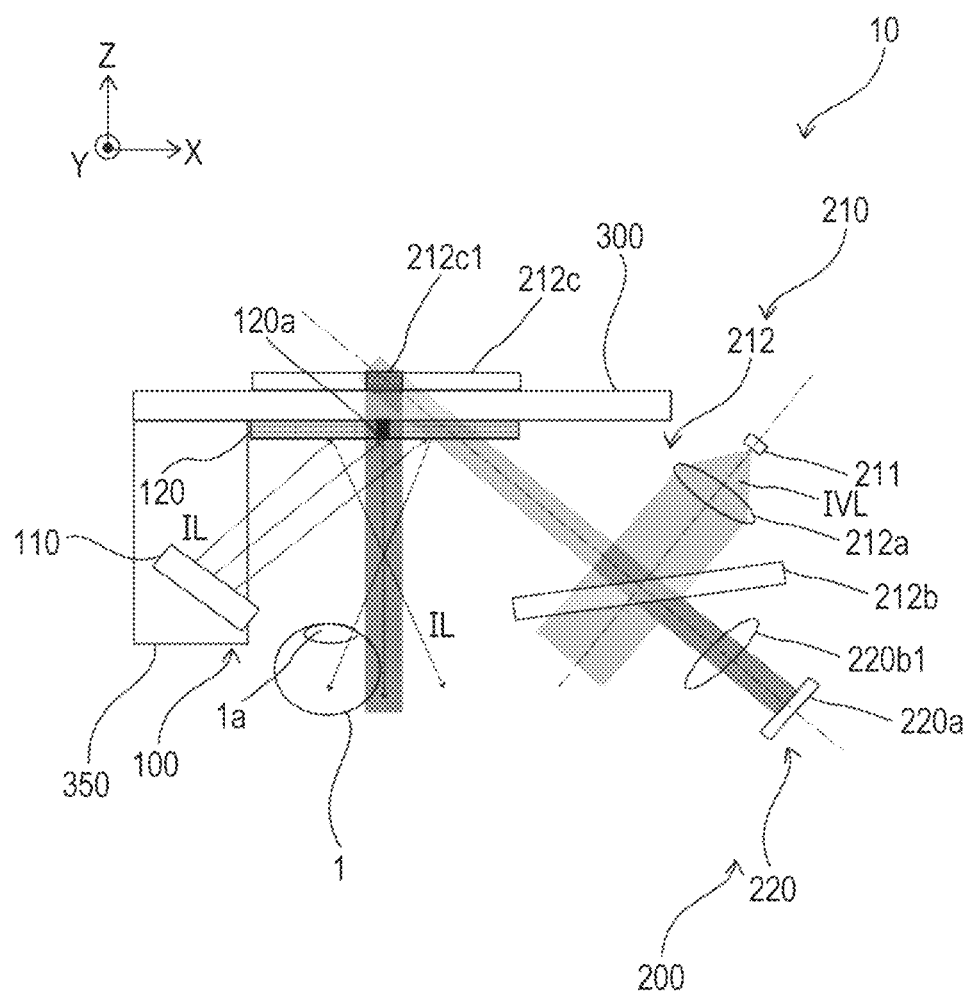
FIG. 5 is a diagram illustrating a state in which an image center deviates from a line-of-sight in the image following device including the image following information detecting device according to the first embodiment of the present technology.
Figure 7A:
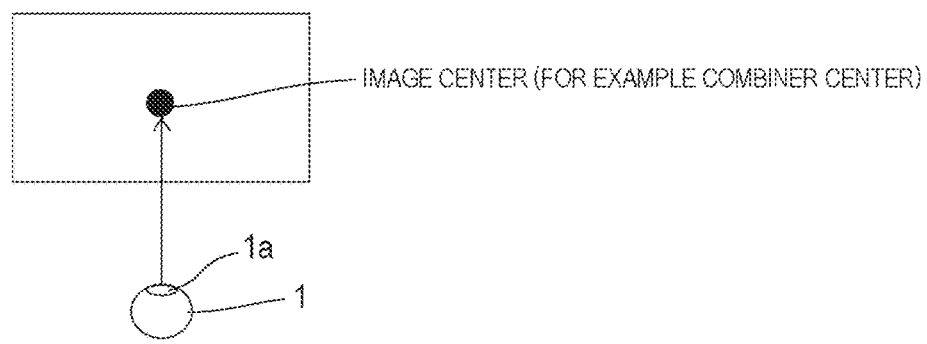
FIGS. 7A to 7C are diagrams for explaining an example of a method for causing the image center to follow the line-of-sight by the image following device including the image following information detecting device according to the first embodiment of the present technology.

For example, in FIGS. 5 and 7A, the misalignment of the glasses equipped with the image following device occurs, the deviation of the combiner center from the line-of-sight is large, and the image light IL is hardly incident into the pupil 1a. In this case, there is a possibility that the image is lost.

In the next Step S5, the main control unit 500a integrally moves the image display system 100, the diffractive optical element 212c, and the transmission substrate 300 on the basis of the deviation of the combiner center from the line-of-sight. Specifically, the main control unit 500a generates a drive signal that preferably becomes 0 so as to minimize the deviation of the image from the line-of-sight, and applies the drive signal to the actuator 400.

Figure 6:
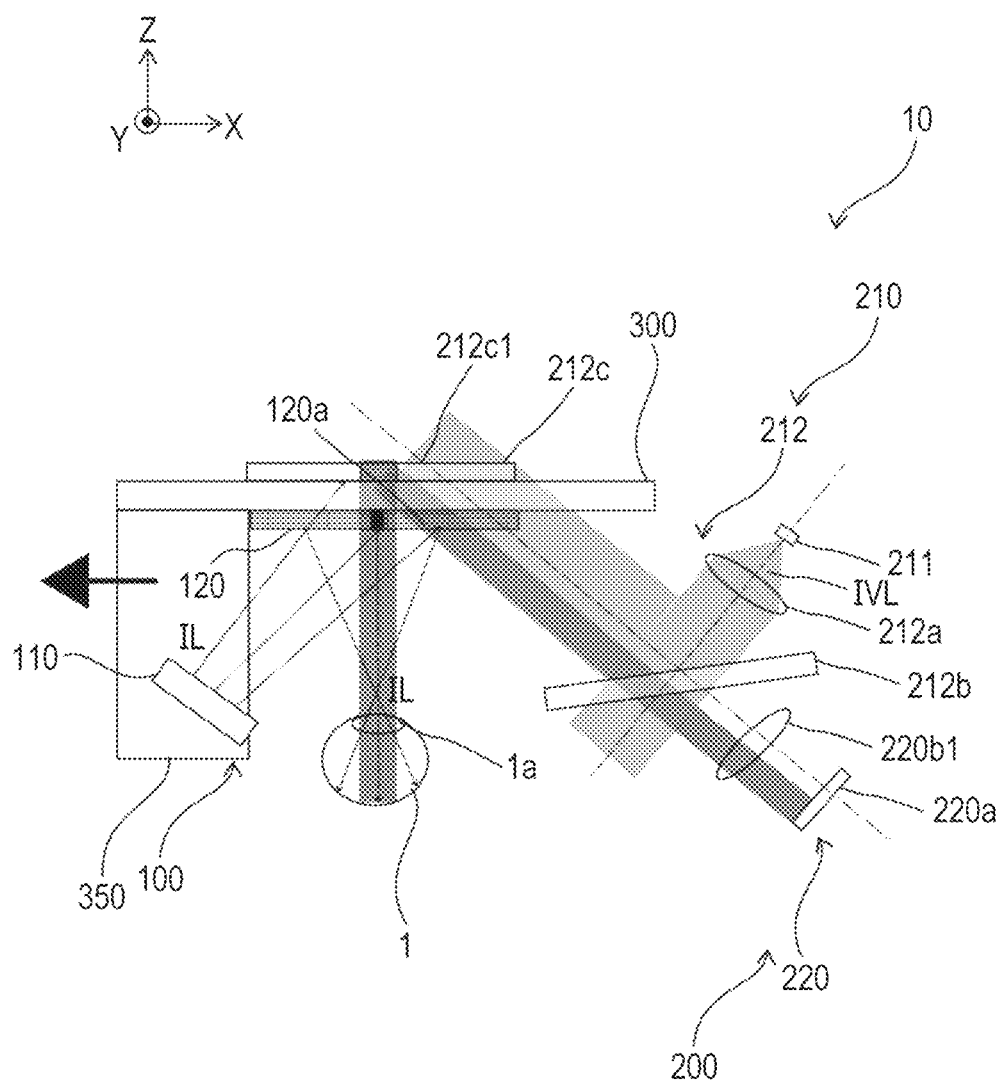
FIG. 6 is a diagram illustrating a state in which an image center is caused to follow a line-of-sight by the image following device including the image following information detecting device according to the first embodiment of the present technology.

For example, as illustrated in FIG. 6, by controlling the actuator 400 from the state illustrated in FIG. 5 to perform the operation of detecting the pupil center position (line-of-sight) by the line-of-sight detection system 200, it is possible to eliminate the deviation of the combiner center from the line-of-sight. That is, it is possible to eliminate the deviation between the line-of-sight and the image center.

Figure 7B:
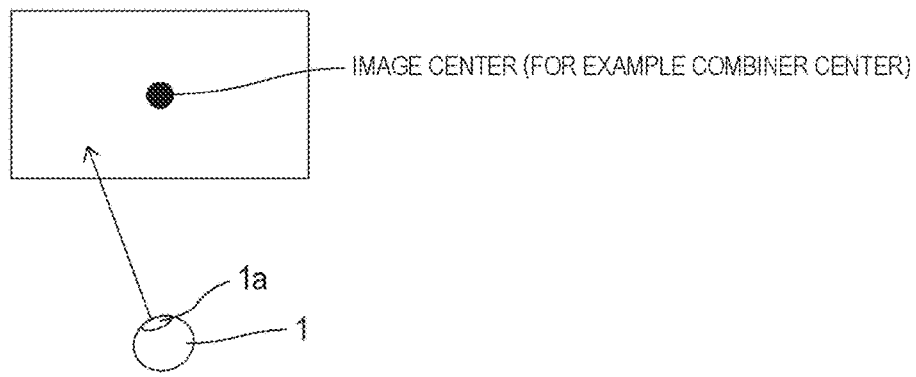
Figure 7C:
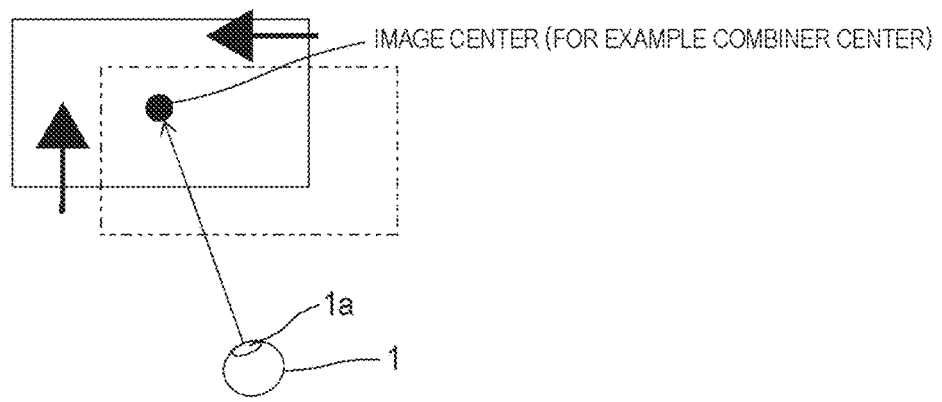

For example, as illustrated in FIG. 7C, by controlling the actuator 400 from the state illustrated in FIG. 7B to perform the operation of detecting the pupil center position, it is possible to eliminate the deviation of the combiner center from the line-of-sight.

In the final Step S6, the main control unit 500a determines whether or not the process has ended. Specifically, for example, the main control unit 500a determines that the processing is ended when the switch of the image following device is turned off by the user, and determines that the processing is not being performed (continuing) when the switch remains in the on state. When the determination in Step S6 is negative, the process returns to Step S4, and when the determination is positive, the flow ends.

(Effects of Image Following Information Detecting Device, Image Following Device, Image Following Information Detecting Method, and Image Following Method)

The image following information detecting device 10 of the first embodiment described above includes: the image display system 100 including the image light projecting unit 110 that projects the image light IL and the transmissive reflection member 120 that reflects a part of the image light IL projected from the image light projecting unit 110 toward the eyeball 1 and transmits the other parts; the line-of-sight detection system 200 including at least one invisible light source 211, the diffractive optical element 212c that is provided integrally with the transmissive reflection member 120 and includes the reflective diffraction portion 212c1 that reflects and diffracts the invisible light IVL from the invisible light source 211 toward the eyeball 1; and the light receiving element 220a that receives the invisible light IVL reflected by the eyeball 1 and reflected and diffracted by the reflective diffraction portion 212c1. Moreover, in the image following information detecting device 10, when viewed from the thickness direction (for example, the Z-axis direction) of the transmissive reflection member 120, the portion 120a irradiated with the central portion of the image light IL of the transmissive reflection member 120 overlaps with the reflective diffraction portion 212c1.

In this case, the deviation between the center of the image displayed by the central portion of the image light IL and the line-of-sight can be obtained by the output of the light receiving element 220a.

As a result, according to the image following information detecting device 10, it is possible to obtain information for causing the central portion of the image to follow the line-of-sight of the user.

Furthermore, according to the image following information detecting device 10, since the configuration in which the light from the invisible light source 211 is reflected and diffracted by the diffractive optical element 212c and incident into the eyeball 1 is adopted, for example, it is not necessary to arrange the light source and the light receiving element on the eyeglass frame of the HMD on which the image following information detecting device 10 is mounted, and a wide visual field of the user can be secured.

When viewed from the thickness direction of the transmissive reflection member 120, the portion 120a of the transmissive reflection member 120 irradiated with the central portion of the image light IL and the central portion of the reflective diffraction portion 212c1 preferably overlap each other. Therefore, it is possible to more accurately obtain the deviation between the image center and the line-of-sight, and eventually, it is possible to obtain more highly accurate information for causing the image to follow the line-of-sight of the user.

An image following device including the image following information detecting device 10 of the first embodiment includes an actuator 400 that moves the image display system 100 and the diffractive optical element 212c in a direction parallel to an in-plane direction of the transmissive reflection member 120, and a control device 500 that controls the actuator on the basis of a signal from the light receiving element 220a of the image following information detecting device 10. This causes the image to follow the line-of-sight of the user.

The light receiving element 220a has a plurality of (for example, four) light receiving regions 220a-1 to 220a-4 that are two-dimensionally arrayed, and the control device 500 detects a deviation between the center of the image displayed by the image display system 100 and the line-of-sight that is the orientation of the eyeball 1 based on the signals from the plurality of light receiving regions 220a-1 to 220a-4, and controls the actuator 400 on the basis of the detection result. Therefore, it is possible to cause the image to follow the line-of-sight of the user with low latency and low power consumption.

According to the image display device (for example, the HMD) including the image following device including the image following information detecting device 10 of the first embodiment, since the combiner center follows the line-of-sight, the user can always view the image center. That is, the state in which the visibility of the user for the image is good is continuously maintained.

An image following information detecting method for detecting image following information for causing an image to follow a line-of-sight using the image following information detecting device 10 of the first embodiment includes: a step of displaying an image by the image display system 100 of the image following information detecting device 10; a step of acquiring a detection result of the line-of-sight detection system 200 as deviation information between the line-of-sight and a central portion of the image; an image light irradiation step of reflecting the image light IL by the transmissive reflection member 120 and irradiating the image light IL to the eyeball 1; and a line-of-sight detecting step of reflecting and diffracting the invisible light IVL by the reflective diffraction portion 212cl provided in the transmissive reflection member 120 to irradiate the eyeball 1 with the invisible light IVL, and reflecting and diffracting the reflected light by the reflective diffraction portion 212cl to receive the light, thereby detecting a line-of-sight that is an orientation of the eyeball 1.

In this case, the deviation between the center of the image displayed by the central portion of the image light IL and the line-of-sight can be obtained by receiving the reflected light from the eyeball 1.

As a result, according to the image following information detecting method, it is possible to obtain information for causing the image to follow the line-of-sight of the user.

An image following method for causing an image to follow a line-of-sight using the image following information detecting device 10 of the first embodiment includes: a step of displaying an image by the image display system 100 of the image following information detecting device 10; a step of acquiring a detection result of the line-of-sight detection system 200 as deviation information between the line-of-sight and a central portion of the image; and a moving step of integrally moving at least the image light projecting unit 110, the transmissive reflection member 120, and the diffractive optical element 212c on the basis of the deviation information. This causes the image to follow the line-of-sight of the user.

3. <Image Following Information Detecting Device According to Second Embodiment of Present Technology and Image Following Device Including Image Following Information Detecting Device>

An image following information detecting device 20 and an image following information detecting device according to a second embodiment of the present technology will be described below with reference to FIGS. 8 to 11.

The pupil diameter of the eyeball changes depending on the luminance of the ambient light and the image light.

Therefore, the image following information detecting device 20 according to the second embodiment has a configuration for coping with such a change in the pupil diameter.

Figure 8:
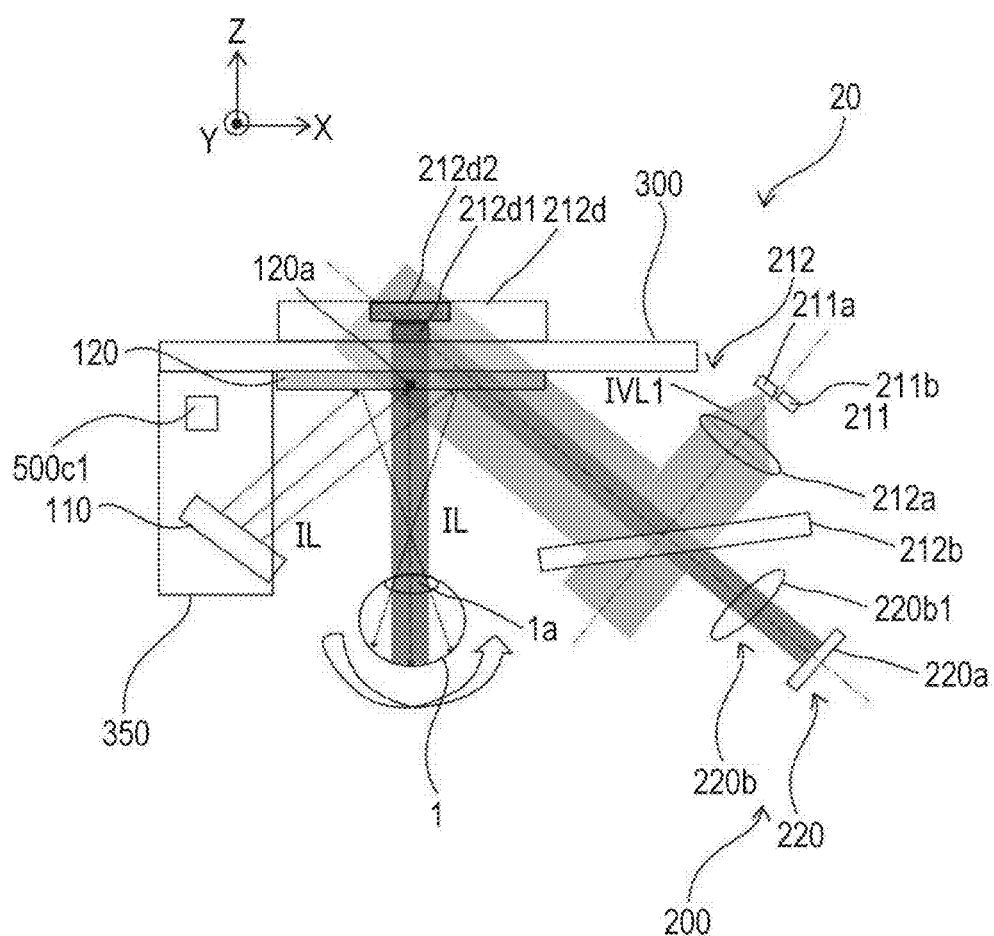
FIG. 8 is a cross-sectional view (part 1) for explaining a Configuration Example of an image following information detecting device according to a second embodiment of the present technology.
Figure 9:
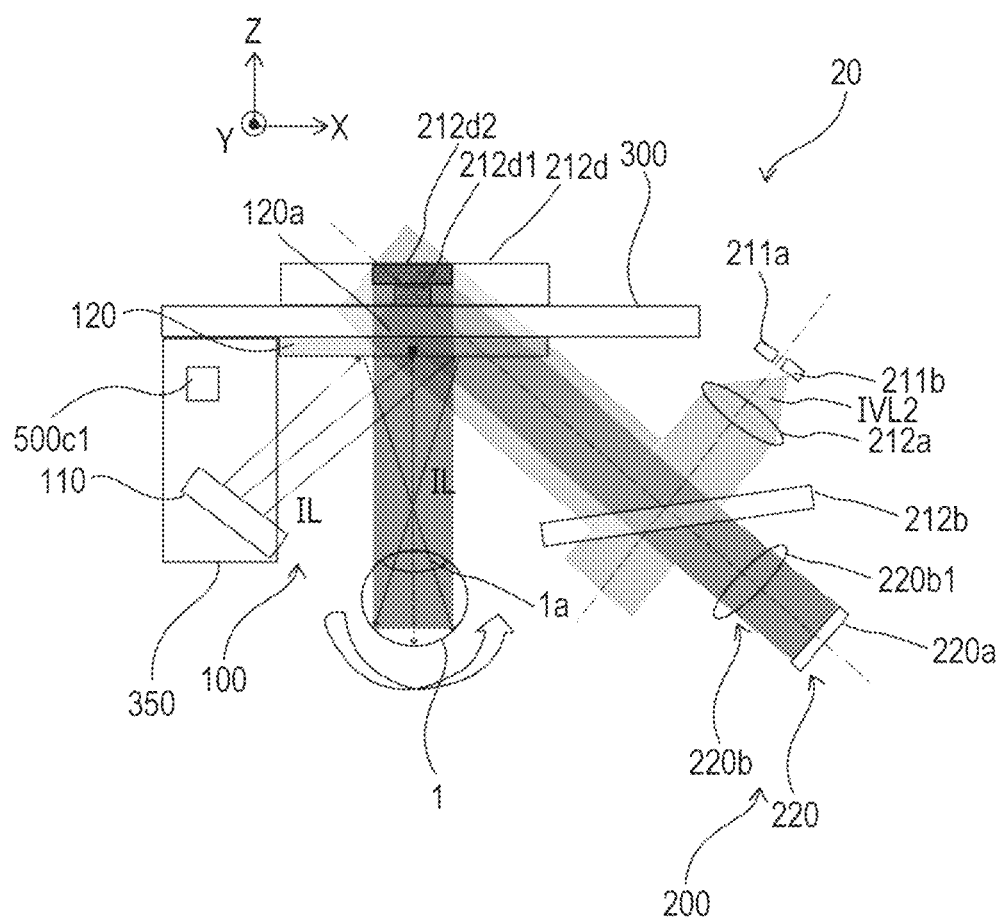
FIG. 9 is a cross-sectional view (part 2) for explaining a Configuration Example of the image following information detecting device according to the second embodiment of the present technology.
Figure 10:
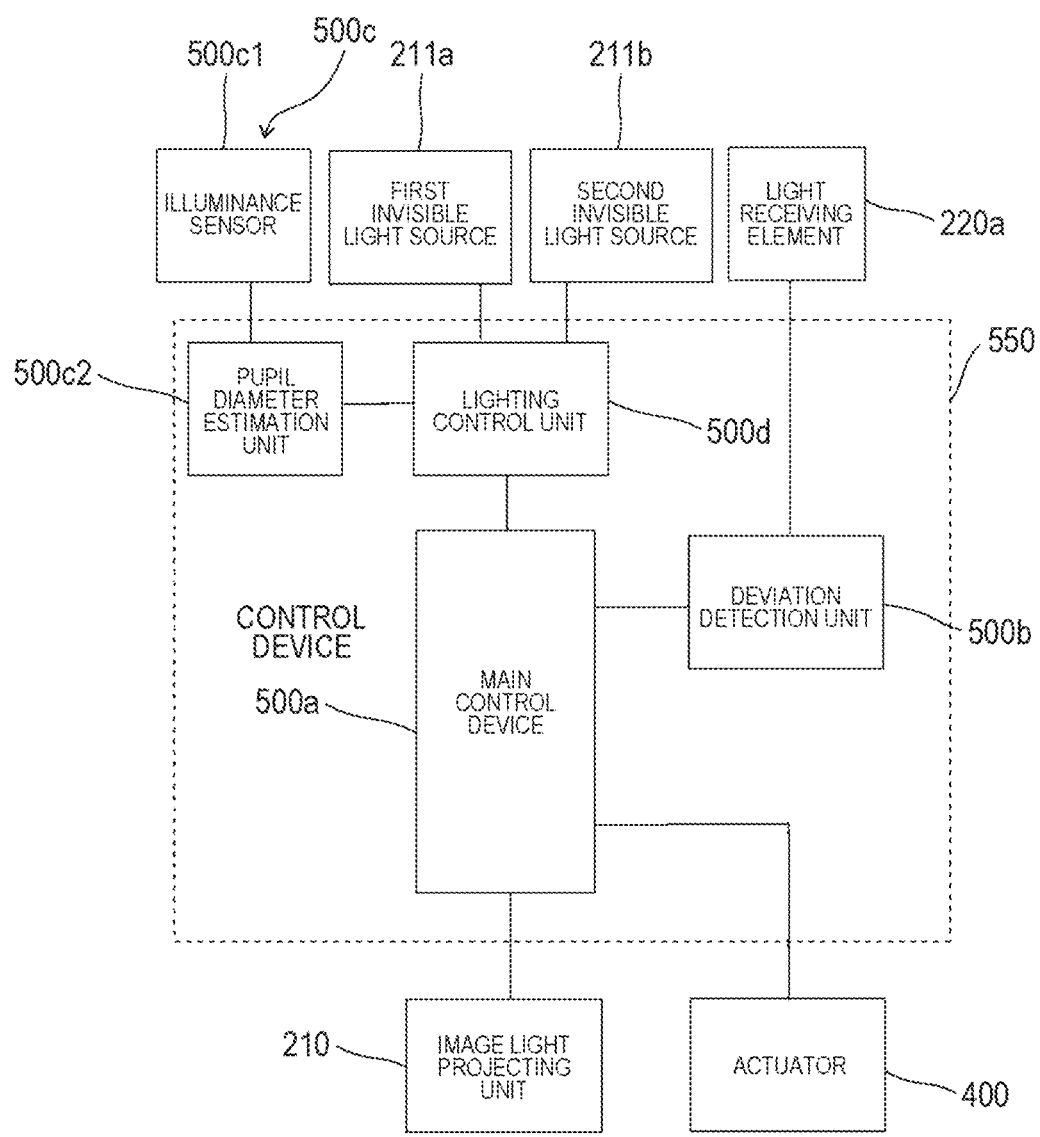
FIG. 10 is a block diagram illustrating a Configuration Example of a control device of an image following device including the image following information detecting device according to the second embodiment of the present technology.

Specifically, as illustrated in FIGS. 8 to 10, in the image following information detecting device 20 according to the second embodiment, the line-of-sight detection system 200 includes a pupil diameter acquisition unit 500c that acquires the pupil diameter of the eyeball 1 (the diameter of the pupil 1a), a plurality of (for example, two) invisible light sources (for example, first and second invisible light sources 211a and 211b) having different emission wavelengths, and a lighting control unit 500d capable of selectively lighting the plurality of invisible light sources 211a and 211b on the basis of the acquisition result in the pupil diameter acquisition unit 500c.

Moreover, as illustrated in FIGS. 8 and 9, in the image following information detecting device 20 according to the second embodiment, the diffractive optical element 212d includes a plurality of (for example, two) reflective diffraction portions (for example, first and second reflective diffraction portions 212d1 and 212d2) that are stacked in the thickness direction (Z-axis direction) and have different diffraction wavelengths and sizes.

The first reflective diffraction portion 212d1 sets the emission wavelength of the first invisible light source 211a as a diffraction wavelength. That is, the first reflective diffraction portion 212d1 diffracts the invisible light IVL1 from the first invisible light source 211a in a specific direction with high efficiency.

The second reflective diffraction portion 212d2 sets the emission wavelength of the second invisible light source 211b as the diffraction wavelength. That is, the second reflective diffraction portion 212d2 diffracts the invisible light IVL2 from the second invisible light source 211b in a specific direction with high efficiency.

As an example, the second reflective diffraction portion 212d2 is larger than the first reflective diffraction portion 212d1.

As an example, the size of each reflective diffraction portion is equal to or smaller than the maximum diameter (for example, 8 mm) of the pupil 1a.

The lighting control unit 500d sequentially lights the first and second invisible light sources 211a and 211b. The pupil diameter acquisition unit 500c acquires the pupil diameter of the eyeball 1 every time the first and second invisible light sources 211a and 211b are turned on. The lighting control unit 500d selects an invisible light source to be lit from the plurality of invisible light sources 211a and 211b on the basis of the acquisition result of the pupil diameter acquisition unit 500c.

As illustrated in FIG. 10, the pupil diameter acquisition unit 500c includes, as an example, an illuminance sensor 500c1 and a pupil system estimation unit 500c2 that estimates the pupil diameter of the eyeball 1 on the basis of the detection result of the illuminance sensor 500c1. The illuminance sensor 500c1 is provided, for example, on the bracket 350 that supports the image light projecting unit 110.

(Operation of Image Following Device)

Figure 11:
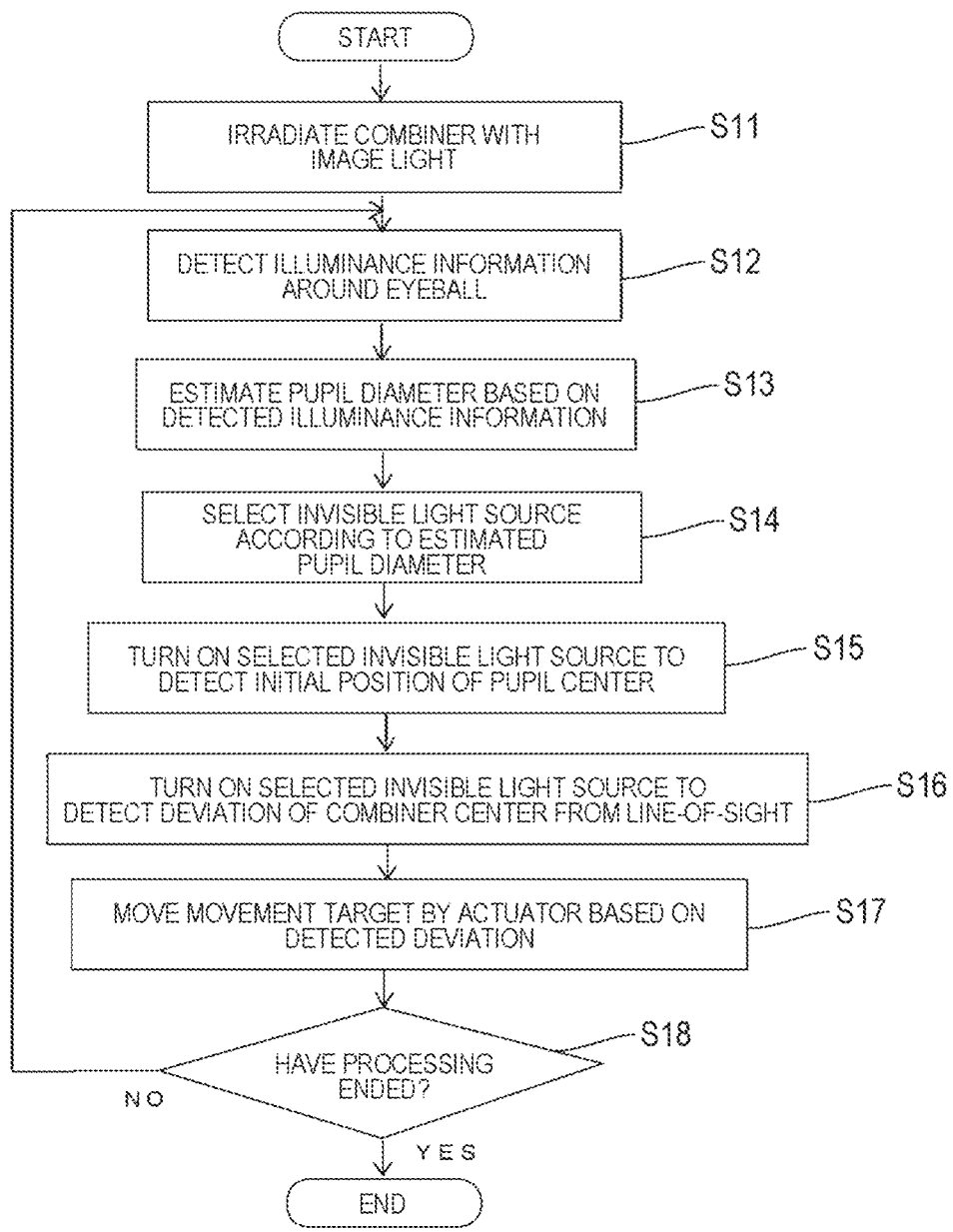
FIG. 11 is a flowchart for explaining an operation example of the image following device including the image following information detecting device according to the second embodiment of the present technology.

Hereinafter, an operation of the image following device including the image following information detecting device 20 according to the second embodiment will be described with reference to a flowchart of FIG. 11. The flowchart of FIG. 11 is based on a processing algorithm executed by the main control unit 500a of a control device 550 (see FIG. 10).

In the first Step S11, the main control unit 500a irradiates the combiner (transmissive reflection member 120) with the image light IL. Specifically, the main control unit 500a projects the image light IL from the image light projecting unit 110 toward the combiner. Note that the main control unit 500a executes Step S11, for example, when the power switch of the image following device is turned on by the user.

In the next Step S12, the illuminance sensor 500c1 detects illuminance information around the eyeball 1.

In the next Step S13, the pupil diameter estimation unit 500c2 estimates the pupil diameter on the basis of the illuminance information detected by the illuminance sensor 500c1. Specifically, for example, the pupil diameter estimation unit 500c2 stores a table representing the correspondence relationship between the pupil diameter and the illuminance in advance in the memory, and the pupil diameter estimation unit 500c2 refers to the table and estimates the pupil diameter corresponding to the detected illuminance information as the pupil diameter at the time of detecting the illuminance information.

In the next Step S14, the lighting control unit 500d selects the invisible light source according to the pupil diameter estimated by the pupil diameter estimation unit 500c2. Specifically, in a case where the estimated pupil diameter is equal to or larger than a threshold (for example, 4 mm) (in a case of a dark pupil), the lighting control unit 500d selects the second invisible light source 211b that is an invisible light source corresponding to the larger reflective diffraction portion 212d2. On the other hand, in a case where the estimated pupil diameter is less than the threshold (for example, 4 mm) (in the case of the bright pupil), the lighting control unit 500d selects the first invisible light source 211a that is the invisible light source corresponding to the smaller reflective diffraction portion 212d1.

In the next Step S15, the main control unit 500a turns on the invisible light source selected by the lighting control unit 500d to detect the initial position of the pupil center.

Specifically, the main control unit 500a obtains the initial position of the pupil center by controlling the actuator 400 to sweep the movement target in the X-axis direction and the Y-axis direction respectively as in Step S2 of the first embodiment described above.

For example, in a case where the first invisible light source 211a is selected, as illustrated in FIG. 8, the invisible light IVL1 emitted from the first invisible light source 211a and passing through the collimating lens 212a and the beam splitter 212b is diffracted toward the eyeball 1 by the first reflective diffraction portion 212d1. At least a part of the invisible light IVL1 incident on the eyeball 1 is reflected and diffracted by the first reflective diffraction portion 212d1, and is incident into the light receiving element 220a via the beam splitter 212b and the condensing lens 220b1.

For example, in a case where the second invisible light source 211b is selected, as illustrated in FIG. 9, the invisible light IVL2 emitted from the second invisible light source 211b and passing through the collimating lens 212a and the beam splitter 212b is diffracted toward the eyeball 1 by the second reflective diffraction portion 212d2. At least a part of the invisible light IVL2 incident into the eyeball 1 is reflected and diffracted by the second reflective diffraction portion 212d2, and is incident into the light receiving element 220a via the beam splitter 212b and the condensing lens 220b1.

That is, since the eyeball 1 is irradiated with the invisible light having a size corresponding to the pupil diameter, the detection accuracy of the pupil center position is improved.

In the state in which the initial position of the pupil center is detected, the deviation of the combiner center from the line-of-sight is 0 (state in which the line-of-sight and the combiner center intersect).

Therefore, this state (the state illustrated in FIG. 8) is set as the initial position of the movement target by the actuator 400.

In the next Step S16, the deviation detection unit 500b turns on the selected invisible light source to detect the deviation of the combiner center from the line-of-sight. Also in this case, as described above, since the detection accuracy of the pupil center position is improved, the detection accuracy of the deviation is also improved.

Specifically, the deviation detection unit 500b detects the deviation (deviation direction and deviation amount) on the basis of the received light amounts of the four light receiving regions 220a-1 to 220a-4 of the light receiving element 220a, and sends the deviation to the main control unit 500a.

In the next Step S17, the main control unit 500a moves the movement target by the actuator on the basis of the detected deviation.

Specifically, the main control unit 500a generates a drive signal that preferably becomes 0 so as to minimize the deviation of the image from the line-of-sight, and applies the drive signal to the actuator 400.

In the final Step S18, the main control unit 500a determines whether or not the process has ended. Specifically, for example, the main control unit 500a determines that the processing is ended when the switch of the image following device is turned off by the user, and determines that the processing is not being performed (continuing) when the switch remains in the on state. When the determination in Step S18 is negative, the process returns to Step S12, and when the determination is positive, the flow ends.

According to the image following information detecting device 20 of the second embodiment described above, since the eyeball 1 is irradiated with the invisible light having a size corresponding to the pupil diameter, it is possible to accurately obtain the deviation of the image center from the line-of-sight.

According to the image following device including the image following information detecting device 20 according to the second embodiment, the image center can accurately follow the line-of-sight.

4. <Image Following Information Detecting Device According to Third Embodiment of Present Technology and Image Following Device Including Image Following Information Detecting Device>

Hereinafter, an image following information detecting device according to a third embodiment of the present technology and an image following device including the image following information detecting device will be described.

The configuration of the image following information detecting device according to the third embodiment is similar to the configuration of the image following information detecting device according to the above-described second embodiment illustrated in FIGS. 8 to 10 except that the pupil diameter acquisition unit 500c and the lighting control unit 500d are not included.

The configuration of the image following device including the image following information detecting device according to the third embodiment is similar to the configuration of the image following device including the image display position adjustment information detecting device according to the above-described second embodiment except that the image following information detecting device does not include the pupil diameter acquisition unit 500c.

In the image following information detecting device according to the third embodiment, the diffractive optical element 212d (see FIGS. 8 and 9) includes the plurality of reflective diffraction portions 212d1 and 212d2 that are stacked in the thickness direction and have different diffraction wavelengths and sizes, the line-of-sight detection system 200 includes the plurality of invisible light sources (for example, the first and second invisible light sources 211a and 211b) having different emission wavelengths, and obtains information (deviation calculation information) for calculating the deviation between the center of the image displayed by the image display system 100 and the line-of-sight that is the orientation of the eyeball 1 for each lighting of the plurality of invisible light sources 211a and 211b.

Figure 12:
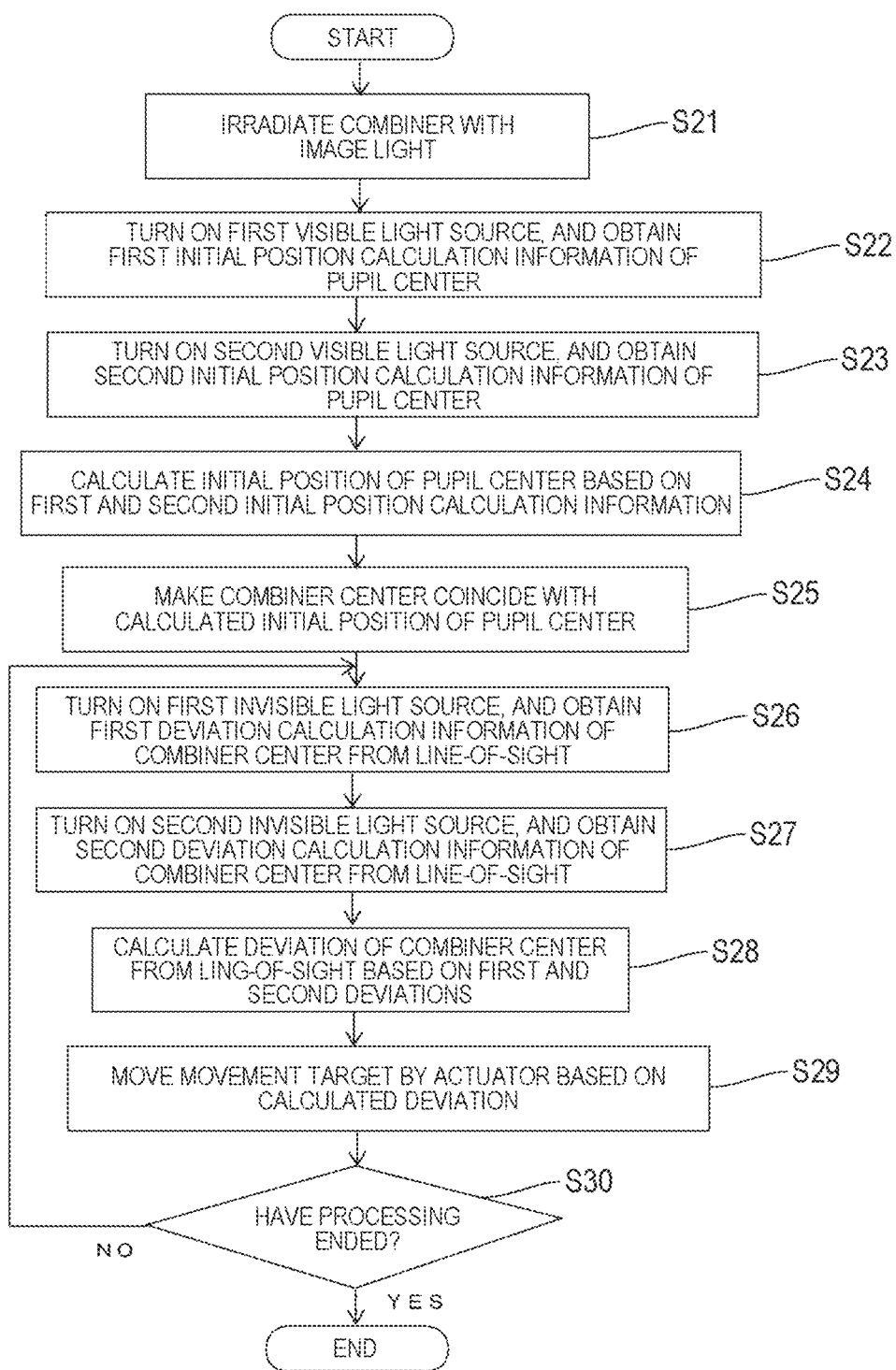
FIG. 12 is a flowchart for explaining an operation example of an image following device including an image following information detecting device according to a third embodiment of the present technology.

Hereinafter, the operation of the image following device including the image following information detecting device according to the third embodiment will be described with reference to FIG. 12.

In the first Step S21, the main control unit 500a irradiates the combiner (transmissive reflection member 120) with the image light IL. Specifically, the main control unit 500a projects the image light IL from the image light projecting unit 110 toward the combiner. Note that the main control unit 500a executes Step S21, for example, when the power switch of the image following device is turned on by the user.

The image light IL is emitted to the combiner.

In the next Step S22, the main control unit 500a turns on the first invisible light source 211a and obtains first initial position calculation information of the pupil center. Specifically, in a state where the first invisible light source 211a is turned on, the main control unit 500a obtains the first initial position calculation information (for example, XY coordinates) of the pupil center by controlling the actuator 400 to sweep the movement target in the X-axis direction and the Y-axis direction respectively as in Step S2 of the first embodiment described above.

In the next Step S23, the main control unit 500a turns on the second invisible light source 211b and detects second initial position calculation information of the pupil center. Specifically, in a state where the second invisible light source 211b is turned on, the main control unit 500a obtains the second initial position calculation information (for example, XY coordinates) of the pupil center by controlling the actuator 400 to sweep the movement target in the X-axis direction and the Y-axis direction respectively as in Step S2 of the first embodiment described above.

In the next Step S24, the main control unit 500a calculates the initial position of the pupil center on the basis of the first and second initial position calculation information. Specifically, for example, the main control unit 500a sets the average value of the X coordinates and the average value of the Y coordinates of the first and second initial position calculation information as the X coordinate and the Y coordinate of the initial position of the pupil center, respectively.

In the next Step S25, the main control unit 500a coincides with the combiner center with the calculated initial position of the pupil center. Specifically, the main control unit 500a causes the actuator 400 to move the movement target along the XY plane by a difference (difference between X coordinates and difference between Y coordinates) between the XY coordinates of the combiner center at the current point in time and the calculated XY coordinates of the initial position of the pupil center.

In the next Step S26, the deviation detection unit 500b turns on the first invisible light source 211a and obtains first deviation calculation information (for example, deviation information in the X-axis direction and deviation information in the Y-axis direction) of the combiner center from the line-of-sight.

In the next Step S27, the deviation detection unit 500b turns on the second invisible light source 211b and obtains second deviation calculation information (for example, deviation information in the X-axis direction and deviation information in the Y-axis direction) of the combiner center from the line-of-sight.

In the next Step S28, the deviation detection unit 500b calculates the deviation of the combiner center from the line-of-sight on the basis of the first and second deviation calculation information. Specifically, for example, the main control unit 500a sets the average value in the X-axis direction and the average value in the Y-axis direction of the first and second deviation calculation information as deviations in the X-axis direction and the Y-axis direction of the combiner center from the line-of-sight, respectively.

In the next Step S29, the main control unit 500a moves the movement target by the actuator on the basis of the calculated deviation.

Specifically, the main control unit 500a generates a drive signal that preferably becomes 0 so as to minimize the deviation of the image from the line-of-sight, and applies the drive signal to the actuator 400.

In the final Step S30, the main control unit 500a determines whether or not the process has ended. Specifically, for example, the main control unit 500a determines that the processing is ended when the switch of the image following device is turned off by the user, and determines that the processing is not being performed (continuing) when the switch remains in the on state. When the determination in Step S30 is negative, the process returns to Step S26, and when the determination is positive, the flow ends.

According to the image following information detecting device according to the third embodiment described above, since the eyeball 1 is irradiated with the invisible light having a size corresponding to the pupil diameter, it is possible to accurately obtain the deviation of the image center from the line-of-sight.

According to the image following device including the image following information detecting device of the third embodiment, the image center can accurately follow the line-of-sight.

5. <Image Following Information Detecting Device According to Fourth Embodiment of Present Technology and Image Following Device Including Image Following Information Detecting Device>

Hereinafter, an image following information detecting device according to a fourth embodiment of the present technology and an image following device including the image following information detecting device will be described.

Figure 13A:
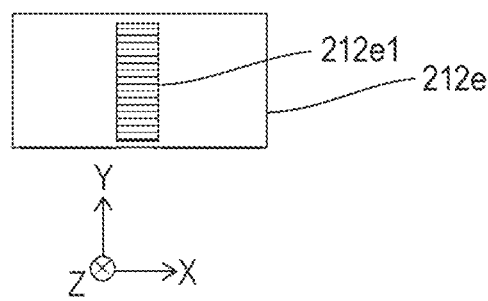
FIGS. 13A and 13B are cross-sectional views of a diffractive optical element for explaining Configuration Examples 1 and 2 of an image following device including an image following information detecting device according to a fourth embodiment of the present technology, respectively.
Figure 13B:
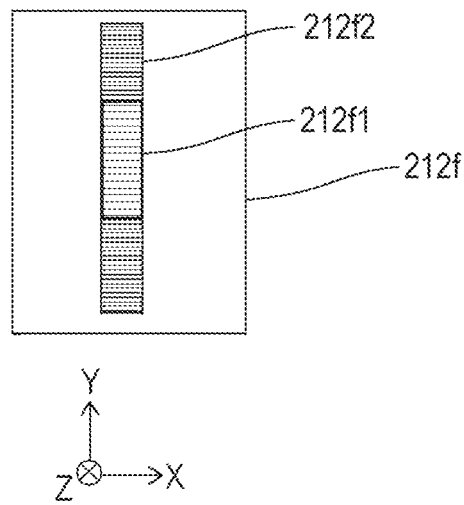

FIGS. 13A and 13B are diagrams for explaining Configuration Example 1 and Configuration Example 2 of the image following device including the image following information detecting device according to the fourth embodiment of the present technology, respectively.

Configuration Example 1 illustrated in FIG. 13A has the same configuration as the image following device including the image following information detecting device of the first embodiment described above except that the configuration of the actuator is different.

Configuration Example 2 illustrated in FIG. 13B has the same configuration as the image following device including the image following information detecting device of the second or third embodiment described above except that the configuration of the actuator is different.

As illustrated in FIGS. 13A and 13B, the actuators of Configuration Examples 1 and 2 of the image following device according to the fourth embodiment are actuators that move the movement target only in one axis direction, for example, the X-axis direction. Examples of the actuator include a uniaxial linear motor, a combination of a ball screw mechanism and a drive source (for example, a motor), and a combination of a rack-and-pinion and a drive source (for example, a motor).

In Configuration Example 1 of the image following information detecting device according to the fourth embodiment, as illustrated in FIG. 13A, a reflective diffraction portion 212e1 of a diffractive optical element 212e has a vertically long shape (a shape in which the Y-axis direction is a longitudinal direction) in which a direction orthogonal to the moving direction (X-axis direction) of the movement target by the actuator is a longitudinal direction.

In this case, since the reflective diffraction portion 212e1 can cover a certain range in the Y-axis direction, the deviation of the combiner center from the line-of-sight is obtained only by moving the movement target in the X-axis direction, and the actuator can be driven to reduce the deviation.

In Configuration Example 2 of the image following information detecting device according to the fourth embodiment, as illustrated in FIG. 13B, the diffractive optical element 212f includes a plurality of (for example, two) reflective diffraction portions 212f1 and 212f2 stacked in the Z-axis direction and having different diffraction wavelengths and sizes.

Each of the two reflective diffraction portions 212f1 and 212f2 has a vertically long shape (a shape in which the Y-axis direction is a longitudinal direction) in which a direction orthogonal to a moving direction (X-axis direction) of the movement target by the actuator is a longitudinal direction.

In this case, since the reflective diffraction portions 212f1 and f2 can cover a certain range in the Y-axis direction, the deviation of the combiner center from the line-of-sight can be obtained only by moving the movement target in the X-axis direction, and the actuator can be driven to reduce the deviation.

Moreover, in Configuration Example 2, since the reflective diffraction portions having different diffraction wavelengths and sizes are stacked, the same operations and effects as those of the second or third embodiment described above can be obtained.

6. <Image Following Information Detecting Device According to Fifth Embodiment of Present Technology and Image Following Device Including Image Following Information Detecting Device>

Hereinafter, an image following information detecting device according to a fifth embodiment of the present technology and an image following device including the image following information detecting device will be described.

Figure 14A:
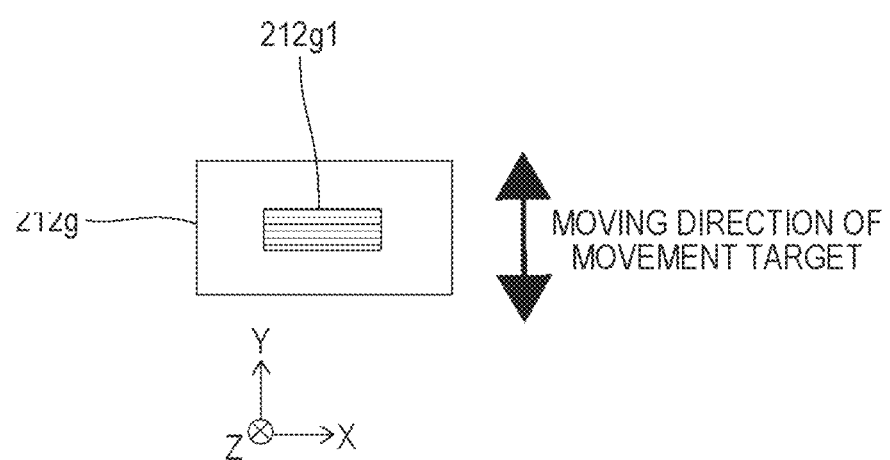
FIGS. 14A and 14B are cross-sectional views of the diffractive optical element for explaining Configuration Examples 1 and 2 of an image following device including an image following information detecting device according to a fifth embodiment of the present technology, respectively.
Figure 14B:
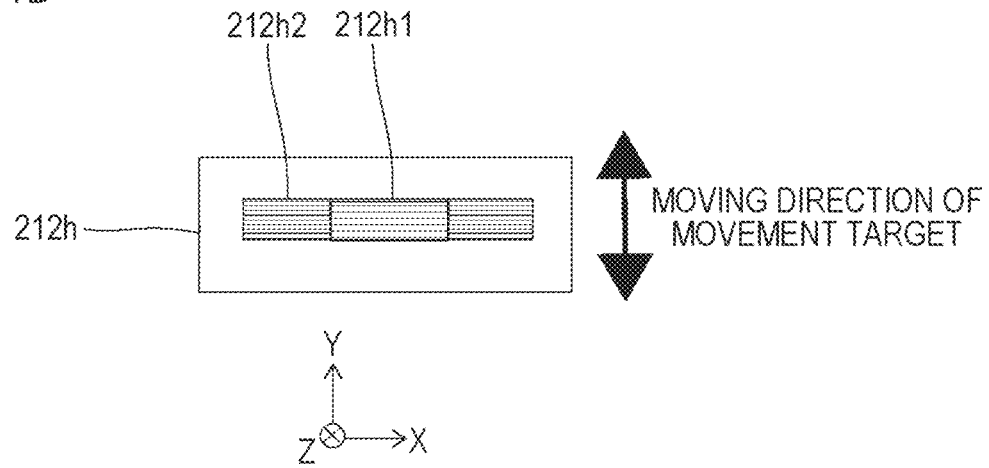

FIGS. 14A and 14B are diagrams for explaining Configuration Example 1 and Configuration Example 2 of the image following device including the image following information detecting device according to the fifth embodiment of the present technology, respectively.

Configuration Example 1 illustrated in FIG. 14A has the same configuration as the image following device including the image following information detecting device of the first embodiment described above except that the configuration of the actuator is different.

Configuration Example 2 illustrated in FIG. 14B has the same configuration as the image following device including the image following information detecting device of the second or third embodiment described above except that the configuration of the actuator is different.

As illustrated in FIGS. 14A and 14B, the actuators of Configuration Examples 1 and 2 of the image following device according to the fifth embodiment are actuators that move the movement target only in one axis direction, for example, the Y-axis direction. Examples of the actuator include a uniaxial linear motor, a combination of a ball screw mechanism and a drive source (for example, a motor), and a combination of a rack-and-pinion and a drive source (for example, a motor).

In Configuration Example 1 of the image following information detecting device according to the fifth embodiment, as illustrated in FIG. 14A, a reflective diffraction portion 212g1 of a diffractive optical element 212g has a horizontally long shape (a shape in which the X-axis direction is a longitudinal direction) in which a direction orthogonal to the moving direction (Y-axis direction) of the movement target by the actuator is a longitudinal direction.

In this case, since the reflective diffraction portion 212g1 can cover a certain range in the X-axis direction, the deviation of the combiner center from the line-of-sight is obtained only by moving the movement target in the Y-axis direction, and the actuator can be driven to reduce the deviation.

In Configuration Example 2 of the image following information detecting device according to the fourth embodiment, as illustrated in FIG. 14B, a diffractive optical element 212h includes a plurality of (for example, two) reflective diffraction portions 212h1 and 212h2 stacked in the Z-axis direction and having different diffraction wavelengths and sizes.

Each of the two reflective diffraction portions 212h1 and 212h2 has a horizontally long shape (a shape in which the X-axis direction is a longitudinal direction) in which a direction orthogonal to a moving direction (Y-axis direction) of the movement target by the actuator is a longitudinal direction.

In this case, since the reflective diffraction portions 212*h*1 and h2 can cover a certain range in the X-axis direction, the deviation of the combiner center from the line-of-sight can be obtained only by moving the movement target in the Y-axis direction, and the actuator can be driven to reduce the deviation.

Moreover, in Configuration Example 2, since the reflective diffraction portions having different diffraction wavelengths and sizes are stacked, the same operations and effects as those of the second or third embodiment described above can be obtained.

7. <Modification of Present Technology>

The configurations of the image following information detecting device of the present technology and the image following device including the image following information detecting device can be changed as appropriate.

For example, the line-of-sight detection system 200 may include a polarizing plate arranged on an optical path of invisible light between the invisible light source and the reflective diffraction portion (for example, an optical path of invisible light between the collimating lens 212*a* and the beam splitter 212*b*). This makes it possible to remove optical noise (for example, Purkinje image) of the invisible light.

For example, the line-of-sight detection system 200 may include a wavelength selection filter (for example, a bandpass filter) arranged on an optical path of invisible light between the reflective diffraction portion and the light receiving element 220*a* (for example, an optical path of invisible light between the condensing lens 220*b*1 and the light receiving element 220*a*). Therefore, for example, the wavelength of invisible light (for example, infrared light) received by the light receiving element 220*a* can be selected.

In each of the embodiments described above, the entire image following information detecting device (including, for example, an invisible light source, a collimating lens, a beam splitter, a condensing lens, and a light receiving element) may be integrally moved by the actuator to reduce (including 0) the deviation of the combiner center with respect to the line-of-sight.

In this case, for example, even if misalignment of the eyeglass frame of the HMD occurs and the deviation of the combiner center with respect to the line-of-sight becomes very large, it is possible to suppress the reflective diffraction portion from deviating from the irradiation range of the invisible light, and thus, it is possible to quickly perform various types of detection.

In each of the embodiments described above, the positional relationship between the invisible light source and the light receiving element with respect to the beam splitter 212*b* may be reversed.

In each of the embodiments described above, the reflective diffraction portion may be irradiated with the image light IL from the image light projecting unit 110 via the beam splitter 212*b*.

In each of the embodiments described above, the diffractive optical element is used as the transmissive reflection member 120, but the present invention is not limited thereto, and for example, a glass plate, a half mirror, and the like may be used.

Furthermore, the present technology can also have the following configurations.

(1) An image following information detecting device including:

an image display system including an image light projecting unit that projects image light, and a transmissive reflection member that reflects a part of the image light projected from the image light projecting unit toward an eyeball and transmits other parts; and a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives the invisible light reflected by the eyeball and reflected and diffracted by the reflective diffraction portion, in which a portion irradiated with a central portion of the image light of the transmissive reflection member and the reflective diffraction portion overlap each other when viewed from a thickness direction of the transmissive reflection member.

(2) The image following information detecting device according to (1), in which a portion of the transmissive reflection member irradiated with a central portion of the image light and a central portion of the reflective diffraction portion overlap each other when viewed from a thickness direction of the transmissive reflection member.

(3) The image following information detecting device according to (1) or (2), in which a size of the reflective diffraction portion is equal to or smaller than a maximum diameter of a pupil of the eyeball.

(4) The image following information detecting device according to (3), in which a maximum diameter of the pupil is 8 mm.

(5) The image following information detecting device according to any one of (1) to (4), in which the image light projecting unit is provided integrally with the transmissive reflection member.

(6) The image following information detecting device according to any one of (1) to (5), in which the light receiving element includes a plurality of light receiving regions.

(7) The image following information detecting device according to (6), in which the plurality of light receiving regions is four light receiving regions arranged two-dimensionally.

(8) The image following information detecting device according to any one of (1) to (7), in which the diffractive optical element includes a plurality of the reflective diffraction portions stacked in a thickness direction and having different diffraction wavelengths and sizes, and the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit.

(9) The image following information detecting device according to (8), in which the pupil diameter acquisition unit includes an illuminance sensor, and obtains the pupil diameter on the basis of a detection result of the illuminance sensor.

(10) The image following information detecting device according to any one of (1) to (7), in which the diffractive optical element includes a plurality of the reflective diffraction portions stacked in a thickness direction and having different diffraction wavelengths and sizes, and the line-of-sight detection system includes a plurality of the invisible light sources having different emission wavelengths, and obtains information for calculating a deviation between a center of an image displayed by the image display system and a line-of-sight that is an orientation of the eyeball for each lighting of the plurality of invisible light sources.

(11) The image following information detecting device according to any one of (1) to (10), further including: a beam splitter that is arranged between the reflective diffraction portion and the light receiving element and into which invisible light from the invisible light source is incident, in which the beam splitter reflects a part of invisible light from the invisible light source toward the reflective diffraction portion and transmits a part of invisible light from the reflective diffraction portion toward the light receiving element.

(12) The image following information detecting device according to any one of (1) to (11), in which the line-of-sight detection system includes a collimating lens that collimates invisible light emitted from the invisible light source.

(13) The image following information detecting device according to any one of (1) to (12), in which the line-of-sight detection system includes a polarizing plate arranged on an optical path of the invisible light between the invisible light source and the reflective diffraction portion.

(14) The image following information detecting device according to any one of (1) to (13), in which the line-of-sight detection system includes a wavelength selection filter arranged on an optical path of the invisible light between the reflective diffraction portion and the light receiving element.

(15) An image following device including:
an image following information detecting device according to any one of (1) to (14), in which the image light projecting unit is provided integrally with the transmissive reflection member;
an actuator that moves the image display system and the diffractive optical element in a direction parallel to an in-plane direction of the transmissive reflection member; and
a control device that controls the actuator on the basis of a signal from a light receiving element of the image following information detecting device.

(16) The image following device according to (15), further including: a collimating lens that collimates invisible light from the invisible light source to have a cross-sectional size corresponding to an expected movement range of the image display system and the diffractive optical element.

(17) The image following device according to (15) or (16), in which the light receiving element includes a plurality of light receiving regions arranged two-dimensionally, and the control device detects a deviation between a center of an image displayed by the image display system and a line-of-sight which is an orientation of the eyeball on the basis of signals from the plurality of light receiving regions, and controls the actuator on the basis of a detection result.

(18) The image following device according to any one of (15) to (17), in which the control device controls the actuator to cause an image by the image light to follow the line-of-sight.

(19) The image following device according to any one of (15) to (18), in which the reflective diffraction portion has a vertically long shape, and the actuator moves the image display system and the diffractive optical element in a direction orthogonal to a longitudinal direction of the reflective diffraction portion.

(20) The image following device according to any one of (15) to (18), in which the reflective diffraction portion has a horizontally long shape, and the actuator moves the image display system and the diffractive optical element in a direction orthogonal to a longitudinal direction of the reflective diffraction portion.

(21) The image following device according to any one of (15) to (18), in which the diffractive optical element includes a plurality of the reflective diffraction portions of a vertically long shape stacked in a thickness direction and having different diffraction wavelengths and sizes, the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit, and the actuator moves the image display system in a direction orthogonal to a longitudinal direction of the reflective diffraction portion.

(22) The image following device according to any one of (15) to (18), in which the diffractive optical element includes a plurality of the reflective diffraction portions of a horizontally long shape stacked in a thickness direction and having different diffraction wavelengths and sizes, the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on the basis of an acquisition result in the pupil diameter acquisition unit, and the actuator moves the image display system in a direction orthogonal to a longitudinal direction of the reflective diffraction portion.

(23) An image display device including: an image following device according to any one of (15) to (22).

(24) An image following information detecting method for causing an image to follow a line-of-sight using an image following information detecting device according to any one of (1) to (14), the method including:
displaying an image by an image display system of the image following information detecting device; and
acquiring a detection result of a line-of-sight detection system of the image following information detecting device as deviation information between the line-of-sight and a central portion of the image.

(25) An image following method for causing an image to follow a line-of-sight using an image following information detecting device according to any one of (1) to (14), the image following method including:
displaying an image by an image display system of the image following information detecting device;
acquiring a detection result of a line-of-sight detection system of the image following information detecting device as deviation information between the line-of-sight and a central portion of the image; and
moving integrally at least the image light projecting unit, the transmissive reflection member, and the diffractive optical element on the basis of the deviation information.

(26) The image following method according to (25), in which in the moving, at least the image light projecting unit, the transmissive reflection member, and the reflective diffraction portion are integrally moved so as to cause the image to follow the line-of-sight.

REFERENCE SIGNS LIST 1 eyeball
1a pupil
10, 20 image following information detecting device
100 image display system
110 image light projecting unit 120 transmissive reflection member
120a portion irradiated with the central portion of image light
200 line-of-sight detection system
211, 211a, 211b invisible light source
212a collimating lens
212b beam splitter
212c diffractive optical element
212cl reflective diffraction portion
220a light receiving element
220a-1 to 220a-4 light receiving region
400 actuator
IL image light
IVL invisible light

What is claimed is:

1. An image following information detecting device, comprising:
an image display system including an image light projecting unit that projects image light, and a transmissive reflection member that reflects a part of the image light projected from the image light projecting unit toward an eyeball and transmits other parts; and
a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives invisible light reflected by the eyeball and reflected and diffracted by the reflective diffraction portion,
wherein a portion irradiated with a central portion of the image light of the transmissive reflection member and the reflective diffraction portion overlap each other when viewed from a thickness direction of the transmissive reflection member,
wherein the diffractive optical element includes a plurality of the reflective diffraction portions stacked in a thickness direction and having different diffraction wavelengths and sizes, and
wherein the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on a basis of an acquisition result in the pupil diameter acquisition unit.

2. The image following information detecting device according to claim 1, wherein the portion of the transmissive reflection member irradiated with a central portion of the image light and a central portion of the reflective diffraction portion overlap each other when viewed from a thickness direction of the transmissive reflection member.

3. The image following information detecting device according to claim 1, wherein a size of the reflective diffraction portion is equal to or smaller than a maximum diameter of a pupil of the eyeball.

4. The image following information detecting device according to claim 3, wherein a maximum diameter of the pupil is 8 mm.

5. The image following information detecting device according to claim 1, wherein the image light projecting unit is provided integrally with the transmissive reflection member.

6. The image following information detecting device according to claim 1, wherein the light receiving element includes a plurality of light receiving regions.

7. The image following information detecting device according to claim 6, wherein the plurality of light receiving regions is four light receiving regions arranged two-dimensionally.

8. The image following information detecting device according to claim 1, further comprising:
a beam splitter that is arranged between the reflective diffraction portion and the light receiving element and into which invisible light from the invisible light source is incident, wherein
the beam splitter reflects a part of invisible light from the invisible light source toward the reflective diffraction portion and transmits a part of invisible light from the reflective diffraction portion toward the light receiving element.

9. The image following information detecting device according to claim 1, wherein the line-of-sight detection system includes a collimating lens that collimates invisible light emitted from the invisible light source.

10. The image following information detecting device according to claim 1, wherein the line-of-sight detection system includes a polarizing plate arranged on an optical path of the invisible light between the invisible light source and the reflective diffraction portion.

11. The image following information detecting device according to claim 1, wherein the line-of-sight detection system includes a wavelength selection filter arranged on an optical path of the invisible light between the reflective diffraction portion and the light receiving element.

12. An image following information detecting method for causing an image to follow a line-of-sight using an image following information detecting device according to claim 1, the method comprising:
displaying an image by an image display system of the image following information detecting device; and
acquiring a detection result of a line-of-sight detection system of the image following information detecting device as deviation information between the line-of-sight and a central portion of the image.

13. An image following method for causing an image to follow a line-of-sight using an image following information detecting device according to claim 1, the image following method comprising:
displaying an image by an image display system of the image following information detecting device;
acquiring a detection result of a line-of-sight detection system of the image following information detecting device as deviation information between the line-of-sight and a central portion of the image; and
moving integrally at least the image light projecting unit, the transmissive reflection member, and the diffractive optical element on a basis of the deviation information.

14. The image following method according to claim 13, wherein in the moving, at least the image light projecting unit, the transmissive reflection member, and the reflective diffraction portion are integrally moved so as to cause the image to follow the line-of-sight.

15. An image following information detecting device, comprising:
an image display system including an image light projecting unit that projects image light, and a transmissive reflection member that reflects a part of the image light projected from the image light projecting unit toward an eyeball and transmits other parts; and
a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives invisible light reflected by the eyeball and reflected and diffracted by the reflective diffraction portion, wherein a portion irradiated with a central portion of the image light of the transmissive reflection member and the reflective diffraction portion overlap each other when viewed from a thickness direction of the transmissive reflection member, wherein the line-of-sight detection system includes a plurality of the invisible light sources having different emission wavelengths, and obtains information for calculating a deviation between a center of an image displayed by the image display system and a line-of-sight that is an orientation of the eyeball for each lighting of the plurality of invisible light sources, wherein the diffractive optical element includes a plurality of the reflective diffraction portions stacked in a thickness direction and having different diffraction wavelengths and sizes, and wherein the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on a basis of an acquisition result in the pupil diameter acquisition unit.

16. The image following information detecting device according to claim 15, wherein the pupil diameter acquisition unit includes an illuminance sensor, and obtains the pupil diameter on a basis of a detection result of the illuminance sensor.

17. An image following device comprising:
an image following information detecting device, comprising:
an image display system including an image light projecting unit that projects image light, and a transmissive reflection member that reflects a part of the image light projected from the image light projecting unit toward an eyeball and transmits other parts; and
a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives invisible light reflected by the eyeball and reflected and diffracted by the reflective diffraction portion,
wherein a portion irradiated with a central portion of the image light of the transmissive reflection member and the reflective diffraction portion overlap each other when viewed from a thickness direction of the transmissive reflection member, and
wherein the image light projecting unit is provided integrally with the transmissive reflection member;
an actuator that moves the image display system and the diffractive optical element in a direction parallel to an in-plane direction of the transmissive reflection member; and
a control device that controls the actuator on a basis of a signal from a light receiving element of the image following information detecting device, wherein:
the diffractive optical element includes a plurality of the reflective diffraction portions of a vertically long shape stacked in a thickness direction and having different diffraction wavelengths and sizes,
the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on a basis of an acquisition result in the pupil diameter acquisition unit, and
the actuator moves the image display system in a direction orthogonal to a longitudinal direction of the reflective diffraction portion.

18. The image following device according to claim 17, further comprising: a collimating lens that collimates invisible light from the invisible light source to have a cross-sectional size corresponding to an expected movement range of the image display system and the diffractive optical element.

19. The image following device according to claim 17, wherein
the light receiving element includes a plurality of light receiving regions arranged two-dimensionally, and
the control device detects a deviation between a center of an image displayed by the image display system and a line-of-sight which is an orientation of the eyeball on a basis of signals from the plurality of light receiving regions, and controls the actuator on a basis of a detection result.

20. The image following device according to claim 17, wherein the control device controls the actuator to cause an image by the image light to follow the line-of-sight.

21. An image display device comprising: an image following device according to claim 17.

22. An image following device comprising:
an image following information detecting device, comprising:
an image display system including an image light projecting unit that projects image light, and a transmissive reflection member that reflects a part of the image light projected from the image light projecting unit toward an eyeball and transmits other parts; and
a line-of-sight detection system including at least one invisible light source, a diffractive optical element provided integrally with the transmissive reflection member and including a reflective diffraction portion that reflects and diffracts invisible light from the invisible light source toward the eyeball, and a light receiving element that receives invisible light reflected by the eyeball and reflected and diffracted by the reflective diffraction portion,
wherein a portion irradiated with a central portion of the image light of the transmissive reflection member and the reflective diffraction portion overlap each other when viewed from a thickness direction of the transmissive reflection member, and
wherein the image light projecting unit is provided integrally with the transmissive reflection member;
an actuator that moves the image display system and the diffractive optical element in a direction parallel to an in-plane direction of the transmissive reflection member; and a control device that controls the actuator on a basis of a signal from a light receiving element of the image following information detecting device,
wherein
the diffractive optical element includes a plurality of the reflective diffraction portions of a horizontally long shape stacked in a thickness direction and having different diffraction wavelengths and sizes,
the line-of-sight detection system includes: a pupil diameter acquisition unit that acquires a pupil diameter of the eyeball; a plurality of the invisible light sources having different emission wavelengths; and a lighting control unit that can selectively light the plurality of invisible light sources on a basis of an acquisition result in the pupil diameter acquisition unit, and
the actuator moves the image display system in a direction orthogonal to a longitudinal direction of the reflective diffraction portion.

23. The image following device according to claim 22, further comprising: a collimating lens that collimates invisible light from the invisible light source to have a cross-sectional size corresponding to an expected movement range of the image display system and the diffractive optical element.

24. The image following device according to claim 22, wherein
the light receiving element includes a plurality of light receiving regions arranged two-dimensionally, and
the control device detects a deviation between a center of an image displayed by the image display system and a line-of-sight which is an orientation of the eyeball on a basis of signals from the plurality of light receiving regions, and controls the actuator on a basis of a detection result.

25. The image following device according to claim 22, wherein the control device controls the actuator to cause an image by the image light to follow the line-of-sight.

\* \* \* \* \*